(12) United States Patent
Muller et al.

(10) Patent No.: US 8,189,981 B2
(45) Date of Patent: May 29, 2012

(54) STABLE LITHIUM NIOBATE WAVEGUIDES, AND METHODS OF MAKING AND USING SAME

(75) Inventors: Heinrich G. Muller, Rancho Palos Verdes, CA (US); Hyun I. Kim, Yorba Linda, CA (US); Brendan J. Foran, Los Angeles, CA (US)

(73) Assignee: The Aerospace Corporation, El Segundo, CA (US)

( * ) Notice: Subject to any disclaimer, the term of this patent is extended or adjusted under 35 U.S.C. 154(b) by 318 days.

(21) Appl. No.: 12/624,147

(22) Filed: Nov. 23, 2009

(65) Prior Publication Data

US 2011/0123163 A1 May 26, 2011

(51) Int. Cl.
*G02B 6/10* (2006.01)
(52) U.S. Cl. .............................. 385/131; 216/24; 65/385
(58) Field of Classification Search ............ 385/14, 385/129–132; 264/24; 65/385
See application file for complete search history.

(56) References Cited

U.S. PATENT DOCUMENTS

| | | | |
|---|---|---|---|
| 5,291,576 A * | 3/1994 | Nakamura | 385/142 |
| 5,347,608 A * | 9/1994 | Nakamura et al. | 385/130 |
| 6,185,355 B1 * | 2/2001 | Hung | 385/132 |
| 6,374,005 B2 * | 4/2002 | Hung | 385/14 |
| 6,567,599 B2 * | 5/2003 | Hung | 385/132 |
| 6,770,132 B1 | 8/2004 | Burrows | |
| 7,170,671 B2 | 1/2007 | Wu et al. | |
| 7,192,480 B2 | 3/2007 | Burrows | |
| 2003/0127042 A1 * | 7/2003 | Tsou et al. | 117/3 |
| 2011/0123163 A1 * | 5/2011 | Muller et al. | 385/129 |

OTHER PUBLICATIONS

Rams, J, J.M. Cabrera, "Nonlinear optical efficient LiNbO3 waveguides proton exchanged in benzoic acid vapor: Effect of the vapor pressure", J. Appl. Phys. 85, 1322 (1999).*
Rams, J. J.M. Cabrera, "Preparation of proton-exchange LiNbO3 waveguides in benzoic acid vapor", J. Opt. Soc. Am. B, vol. 1, No. 3, 401-6 (1999).*
Korkishko et al., "Reverse proton exchange for buried waveguides in LiNbO3", J. Opt. Soc. Am. A/vol. 15, No. 7., 1838-42, (1998).*
Jackel et al., "Reverse exhange method for burying proton exchanged waveguides", Electronics Letters, vol. 27, No. 15, 1360-1, (1991).*
Korkishko et al., "Characterization of a-phase soft proton-changed LiNbO3 optical waveguides", J. Opt. Soc. Am. A/vol. 18, No. 5, 1186-91, (2001).*

(Continued)

*Primary Examiner* — Charlie Peng
(74) *Attorney, Agent, or Firm* — Jones Day; Nicola A. Pisano; Jaime D. Choi

(57) ABSTRACT

The invention provides stable lithium niobate waveguides, and systems and methods for making same. In accordance with one aspect of the invention, a waveguide includes a lithium niobate substrate having an upper surface; and a soft proton-exchanged layer embedded within the substrate, the soft proton-exchanged layer formed by exposing the lithium niobate substrate to a proton exchange solution including a proton exchange acid and a lithium salt of the proton exchange acid at a temperature of less than an atmospheric boiling point of the solution, followed by annealing the lithium niobate substrate under a vapor pressure of water preselected to inhibit protons in the substrate from forming water and evaporating from the upper surface of the substrate. The preselected water vapor pressure may be between 0.1 atm and about 0.9 atm, for example, between about 0.4 atm and about 0.6 atm, in one embodiment about 0.47 atm.

18 Claims, 17 Drawing Sheets

OTHER PUBLICATIONS

Armenise et al., "Characterization of $(Ti_{0.65}Nb_{0.35})O_2$ compound as a source for Ti diffusion during Ti:LiNbO$_3$ optical waveguides fabrication," Journal of Applied Physics, vol. 54, No. 1, Jan. 1983, pp. 62-70.

Armenise et al., "Characterization of TiO$_2$, LiNb$_3$O$_8$, and $(Ti_{0.65}Nb_{0.35})O_2$ compound growth observed during Ti:LiNbO$_3$ optical waveguide fabrication," Journal of Applied Physics, vol. 54, No. 11, Nov. 1983, pp. 6223-6231.

Chen et al., "Hybrid modes in proton exchanged waveguides realized in LiNbO$_3$, and their dependence on fabrication parameters," Journal of Lightwave Technology, vol. 12, No. 5, May 1994, pp. 862-871.

De Micheli et al., "Independent control of index and profiles in proton-exchanged lithium niobate guides," Optics Letters, vol. 8, No. 2, Feb. 1983, pp. 114-115.

Deshmukh et al., "Domain structure in lithium niobate single crystals," Journal of Physics D: Applied Physics, vol. 5, 1972, pp. 1680-1687.

Glass et al., "Ionic conductivity of quenched alkali niobate and tantalate glasses," Journal of Applied Physics, vol. 49, No. 9, Sep. 1978, pp. 4808-4811.

Gonzalez et al., "Effect of environment on radiation-induced outdiffusion of deuterons and protons from crystalline LiNbO$_3$ at low temperatures," Physical Review Letters, vol. 67, No. 15, Oct. 1991, pp. 2057-2059.

Jackel et al., "Proton exchange for high-index waveguides in LiNbO$_3$," Applied Physics Letters, vol. 41, No. 7, Oct. 1982, pp. 607-608.

Jackel et al., "Reverse exchange methods for burying proton exchanged waveguides," Electronics Letters, vol. 27, No. 15, Jul. 1991, pp. 1360-1361.

Koide et al., "Prevention of thermal degradations by using dehydrated LiNbO$_3$ crystal," Jpn. J. Appl. Phys., vol. 33, Part 2, No. 7A, Jul. 1994, pp. L957-L958.

Lee et al., "Direct observation of structural phase changes in proton-exchanged LiNbO$_3$ waveguides using transmission electron microscopy," Journal of Applied Physics, vol. 59, No. 8, Apr. 1986, pp. 2629-2633.

Lee, "Realization of ultrasmooth surface with atomic scale step structure on LiNbO$_3$ and LiTaO$_3$ substrates," Optics Express, vol. 10, No. 13, Jul. 1, 2002, pp. 556-560.

Nagata et al., "Bias stability of OC48 x-cut lithium niohate optical modulators: four years of biased aging test results," IEEE Photonics Technology Letters, vol. 15, No. 1, Jan. 2003, pp. 42-44.

Svaasand et al., "Crystal growth and properties of LiNb$_3$O$_8$," Journal of Crystal Growth, vol. 18, 1973, pp. 179-184.

Veng et al., "Dilute-melt, proton-exchange slab waveguides in LiNbO$_3$: a new fabrication and characterization method," Applied Optics, vol. 36, No. 24, Aug. 1997, pp. 5941-5948.

\* cited by examiner

STABLE LITHIUM NIOBATE WAVEGUIDES, AND METHODS OF MAKING AND USING SAME

STATEMENT OF GOVERNMENT INTEREST

This invention was made with Government support under contract FA8802-04-C-0001 awarded by the Department of the Air Force. The Government has certain rights in the invention.

FIELD OF THE INVENTION

This application generally relates to lithium niobate waveguides, and methods of making and using same.

BACKGROUND OF THE INVENTION

Electro-optically active devices have conventionally been prepared using lithium niobate ($LiNbO_3$). As is familiar to those of ordinary skill in the art, lithium niobate has a lattice structure in which the lithium ions have a non-centrosymmetric position. In the absence of an electric field, this non-centrosymmetric position imparts the material with a net polarization. Applying an electric field to the lithium niobate shifts the position of the lithium ions, changing the net polarization, and refractive index, of the material. Thus, the phase of light propagating through the waveguide may be altered by applying an electric field to the waveguide.

FIGS. 1A and 1B schematically illustrate an exemplary electro-optically active device 100 that includes lithium niobate substrate 101 in which waveguide 102 is formed, input optical fiber 111, output optical fibers 112, and voltage generator 121. Waveguide 102 may be formed by exchanging protons for some of the lithium ions in the substrate 101 within defined areas, e.g., by immersing the substrate into a solution containing a proton exchange acid, such as benzoic acid. The proton-exchanged areas have a higher extraordinary refractive index than the remainder of the substrate, and so act as a waveguide 102 that transports light through substrate 101 with relatively low loss. In the illustrated device, light is introduced to waveguide 102 through input optical fiber 111. Junction 105 of waveguide 102 divides the light into two portions and respectively guides the light portions into sections 106 and 107 of waveguide 102. Electrodes 122 are positioned on either side of the waveguide sections 106, 107, and separated from the waveguide sections by buffer regions 103. In one example, the inner edges of the electrodes are spaced approximately 10 microns from each other.

Voltage generator 121 is programmed to independently apply voltages to different pairs of the electrodes 122, so as to change the phase of the light traveling through the waveguide section adjacent that pair. For example, as illustrated in FIG. 1B, waveguide section 106 has a net polarization 104 in the absence of an electric field. Voltage generator 121 (not shown in FIG. 1B) may apply a voltage across electrodes 122, which generates an electric field along the crystallographic z-axis to change the net electrical polarization 104 of waveguide section 106, which induces a phase change of light traveling through that section. The magnitude of the change in the material's net polarization, and the magnitude of the phase change, may be proportional to the applied electric field. The light in waveguide sections 106, 107, may be coupled out of waveguide 102 and into separate output optical fibers 112.

Alternatively, in the electro-optically active device 100' illustrated in FIG. 1C, the light in sections 106', 107' of waveguide 102' may instead be recombined at junction 108', where they interfere with one another. Because the relative phase of the light portions traveling through waveguide sections 106', 107' may be controlled via voltage generator 121', the intensity of the light at junction 108' may be modulated as desired. For example, if the portion of light in section 106' is phase delayed by an even multiple of $\pi$ relative to that in section 107', then the two portions of light will constructively interfere with each other, yielding maximum brightness. Or, for example, if the portion of light in section 106' is phase delayed by an odd multiple of $\pi$ relative to that in section 107', then the two portions will completely interfere with each other, yielding minimal brightness. Any intensity in between may be selected by adjusting the relative phase delays via voltage generator 121'. The output of waveguide 102' is coupled into a single output optical fiber 112'. Configurations such as that illustrated in FIG. 1C may be referred to as a Mach-Zehnder modulator. Waveguide configurations other than those illustrated are also common.

Lithium niobate waveguides prepared using conventional proton exchange techniques are vulnerable to performance degradation, limiting their application. For example, as illustrated in FIG. 2, a waveguide 202 may be prepared by contacting a substrate 201 with a solution 211 that contains protons but does not dissolve lithium niobate. Near the upper surface of the substrate, protons diffuse into the lithium niobate lattice, displacing lithium ions which then become dissolved in the solution 211. The proton exchange is allowed to proceed until the protons have sufficiently penetrated substrate 201 to form waveguide 202, which has a refractive index suitable for containing light with relatively low loss, e.g., as described above with respect to FIGS. 1A-1C.

However, the resulting waveguide may be unstable due to stresses caused by the ion exchange process. These stresses may damage the waveguide by causing crystal dislocations and/or cracks. For example, FIG. 3A is a transmission electron microscope image of a lithium niobate waveguide prepared by immersing substrate 301 into undiluted benzoic acid at 230° C. for one hour. Proton exchanged layer 302, which has a thickness of about 1.3 microns and forms the top portion of substrate 301, contains numerous crystalline defects 303, visible as parallel lines. Such defects may arise, for example, because protons are smaller than the lithium ions they replace, causing the crystal lattice to shrink. The sharp interface between the proton exchanged layer 302 and remainder of the substrate 301 corresponds to a change in lithium niobate phase. Because the transition between waveguide 302 and substrate 301 is abrupt, the mismatch of the crystalline lattices may induce stress and cause the defects 303 apparent in FIG. 3A. FIG. 3B is an electron beam diffraction pattern from a sample similar to that shown in FIG. 3A. As can be seen, the diffraction pattern includes several bright peaks 311 that are spaced far apart from one another, corresponding to the regular crystalline lattice. There are also numerous dimmer peaks 312 in the pattern that are spaced closer to each other, corresponding to large-scale "superlattice" defects in the crystalline lattice, with a lattice constant that is about 5 times larger than the basic lithium niobate lattice, demonstrating that a different phase has been formed.

Any defects in the waveguide may serve as electron donors, proton diffusion pathways, and/or proton accumulation sites, which may detrimentally affect both the electrical insulation and the stability of the waveguide material. Due to this instability, the performance of the crystal may degrade over time, including gradual changes in refractive index and/or electrical conductivity. As illustrated in FIG. 2, such degradation may be reduced by annealing the waveguide before use, which may heal coarse lattice defects and convert the relatively thin waveguide 202 into a thicker waveguide 204 having a lower proton concentration and a more gradual transition between the crystal lattices of the waveguide 204 and the underlying substrate 201. Such annealing may also cause lateral diffusion of the waveguide, reducing the width of the buffer between the waveguide and the electrodes discussed above with respect to FIGS. 1A-1B. Such annealed waveguides are still susceptible to degradation under normal operating conditions, albeit much more slowly than non-annealed waveguides.

Drifts in the refractive index of the waveguide may be electronically compensated for by monitoring the phase and/or intensity of the light output from the waveguide, and adjusting the magnitude of the electric fields to achieve similar performance. For example, by increasing the voltage, a satisfactory response may be obtained; however, once the degradation exceeds the ability of the electronics to compensate for such drift, the waveguide may no longer be capable of performing to specification. Compensating for drifts in the electrical conductivity of the waveguide may also be difficult to achieve. Lithium niobate is a very good insulator, having a conductivity of less than $10^{-12}$ $(\Omega cm)^{-1}$. Disturbances of the crystalline lattice cause a substantial increase in conductivity, which allows space charges to accumulate near the electrodes, producing a drift condition. The feedback circuitry required to adjust the applied voltage to compensate for drift in the refractive index and electrical conductivity of the waveguide may add significant expense and complication to the modulator circuit, may limit the switching speed of the device, and may limit the environments in which the device may be used.

U.S. Pat. No. 7,170,671 to Wu et al. discloses a method of forming waveguides that includes exposing a lithium niobate crystal to a diluted proton exchange step, followed by a reverse proton exchange step. Specifically, Wu discloses diluting benzoic acid, a proton exchange medium, by adding lithium benzoate, and applying the diluted solution to the crystal surface at a temperature of 300-380° C. for several tens of hours. Wu discloses that such processing provides a crystal having a single phase. Wu discloses that a high temperature anneal of the crystal after the proton substitution could damage the crystal, and that it is advantageous that the method eliminates the need for such post exchange heat treatment. Wu discloses that the refractive index of the optical waveguide region may be further shaped and rendered symmetric by following the proton exchange using a reversed proton exchange (RPE) method. Although Wu alleges that a waveguide of very high quality may be obtained using these two steps, the high-temperature diluted proton exchange requires exposing the crystal to a temperature well in excess of the atmospheric boiling point of benzoic acid, which is about 250° C. Because benzoic acid would otherwise be in a gaseous phase at the reported temperatures of 300-380° C. at atmospheric pressure (1 atm), it can reasonably be inferred that Wu's method requires pressurizing the heated proton exchange solution well above atmospheric pressure to maintain it in a liquid phase during the reaction. Such pressurization may be both inconvenient and dangerous, particularly over extended periods of time.

SUMMARY

The present invention provides stable lithium niobate waveguides having improved stability, and methods of making and using same. Specifically, the waveguides may be fabricated using a plurality of steps, each of which inhibits the formation of performance-degrading defects. For example, a high-refractive index layer may be prepared using a "soft" proton exchange on a lithium ion substrate, in which an excess of lithium ions are provided to slow the proton exchange reaction, allowing more time for the protons to diffuse into the substrate and thus reducing defect-inducing stress. Such a proton exchange step may be followed by an annealing step, during which a predetermined vapor pressure of water is applied over the substrate. The vapor pressure of water may be selected to (a) inhibit dehydration of the substrate, reducing the formation of defects, and (b) provide a specified stoichiometric ratio of niobium to oxygen in the proton-exchanged layer. Such an anneal step may be followed by a sealing step, in which the substrate is exposed to a reverse proton exchange, which replaces protons near the upper surface of the substrate with lithium ions. This sealing step forms a high quality protective lithium niobate overlayer over the proton-exchanged layer, which inhibits degradation of the proton-exchanged layer during use.

In accordance with one aspect of the invention, a waveguide includes a lithium niobate substrate having an upper surface; and a soft proton-exchanged layer embedded within the substrate, the soft proton-exchanged layer formed by exposing the lithium niobate substrate to a proton exchange solution including a proton exchange acid and a lithium salt of the proton exchange acid at a temperature of less than an atmospheric boiling point of the solution, followed by annealing the lithium niobate substrate under a vapor pressure of water preselected to inhibit protons in the substrate from forming water and evaporating from the upper surface of the substrate.

In some embodiments, the soft proton-exchanged layer consists essentially of lithium niobate and hydrogen niobate. The preselected water vapor pressure may be between 0.1 atm and about 0.9 atm, for example, between about 0.4 atm and about 0.6 atm, in one embodiment about 0.47 atm.

In one illustrative embodiment, the proton exchange acid is benzoic acid, the lithium salt of the proton exchange acid is lithium benzoate, and the temperature is between about 122° C. and 250° C.

Some embodiments further include an overlayer comprising lithium niobate, the overlayer embedded between the upper surface of the lithium niobate substrate and the soft proton-exchanged layer. The overlayer may inhibit substantially all transport of protons from the soft proton-exchanged layer to the upper surface of the substrate. The overlayer may consist essentially of lithium niobate. The overlayer may comprise a substantially defect free region extending between about 10 nm below the upper surface of the substrate and the soft proton-exchanged layer. In some embodiments, the overlayer is formed by exposing the annealed soft proton-exchanged layer to a reverse proton-exchange solution, the reverse proton-exchange solution comprising a lithium salt.

In accordance with another aspect of the present invention, a method of making a waveguide includes providing a lithium niobate substrate having an upper surface; forming a soft proton-exchanged layer comprising hydrogen niobate by exposing the upper surface of the substrate to a soft proton-exchange solution, the soft proton-exchange solution comprising a proton exchange acid and a lithium salt of the proton exchange acid at a temperature of less than an atmospheric boiling point of the solution; and annealing the soft proton-exchanged layer under a vapor pressure of water preselected to inhibit protons in the hydrogen niobate from forming water and evaporating from the upper surface of the substrate.

In some embodiments, the soft proton-exchange solution comprises about 2% to about 6% lithium benzoate and about 98% to about 94% benzoic acid. The temperature may be between about 122° C. and 250° C.

In some embodiments, the preselected vapor pressure of the water is between about 0.1 atm and about 0.9 atm, for example, between about 0.4 atm and about 0.6 atm, and in one embodiment about 0.47 atm.

Some embodiments further include forming a protective lithium niobate overlayer over the annealed soft proton-exchanged layer by exposing the annealed soft proton-exchanged layer to a reverse proton-exchange solution, the reverse proton-exchange solution comprising a lithium salt. The method may include etching the upper surface of the substrate after forming the protective lithium niobate overlayer. For example, the etching may include exposing the upper surface of the substrate to hydrofluoric acid.

In accordance with yet another aspect of the present invention, a method of using a waveguide includes providing a waveguide, the waveguide comprising a lithium niobate substrate having an upper surface, a soft proton-exchanged layer formed by exposing the lithium niobate substrate to a proton exchange solution including a proton exchange acid and a lithium salt of the proton exchange acid at a temperature of less than an atmospheric boiling point of the solution, followed by annealing the lithium niobate substrate under a vapor pressure of water preselected to inhibit protons in the substrate from forming water and evaporating from the upper surface of the substrate, and an overlayer comprising lithium niobate, the overlayer embedded between the upper surface of the lithium niobate substrate and the soft proton-exchanged layer, the overlayer inhibiting substantially all transport of protons from the soft proton-exchanged layer to the upper surface of the substrate; and operating the waveguide for greater than 100 days with substantially no degradation in performance and without the use of drift-compensation circuitry. For example, the waveguide may be operated for greater than one year with substantially no degradation in performance and without the use of drift-compensation circuitry.

DETAILED DESCRIPTION

Overview

Embodiments of the present invention provide lithium niobate waveguides that have few, if any, defects in the crystalline lattice, and are stable under a wide variety of environmental conditions. Thus, in contrast to waveguides made in accordance with previously known methods, feedback circuitry need not be used to monitor the performance of the inventive waveguides and continually adjust the applied voltages to compensate for drifts in performance.

Figure 3B:
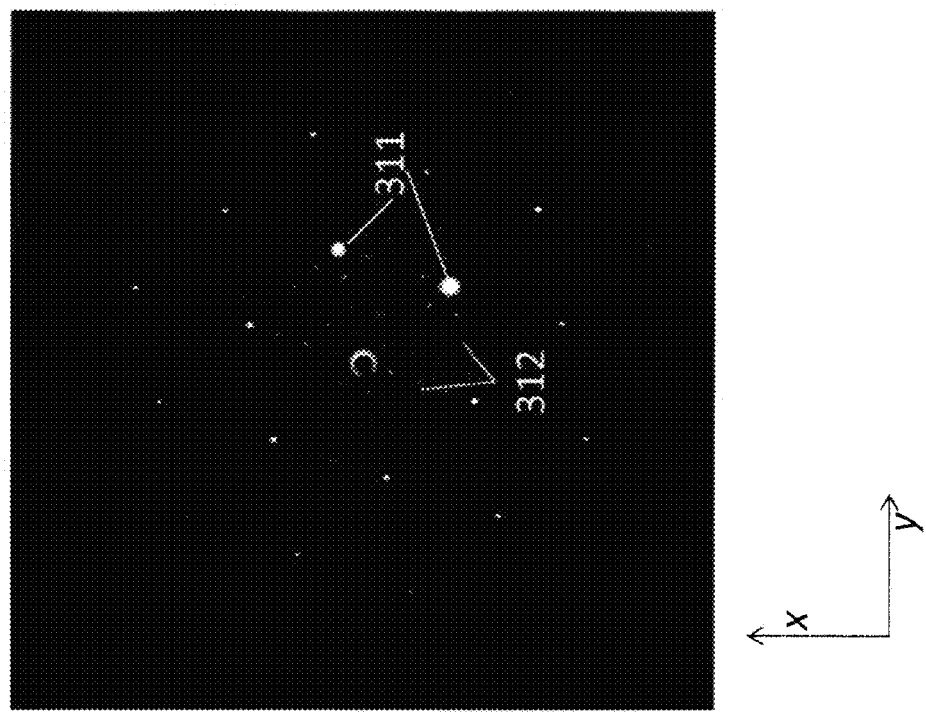
FIG. 3B is an electron-beam diffraction pattern from a lithium niobate waveguide made in accordance with previously known methods.
Figure 3A:
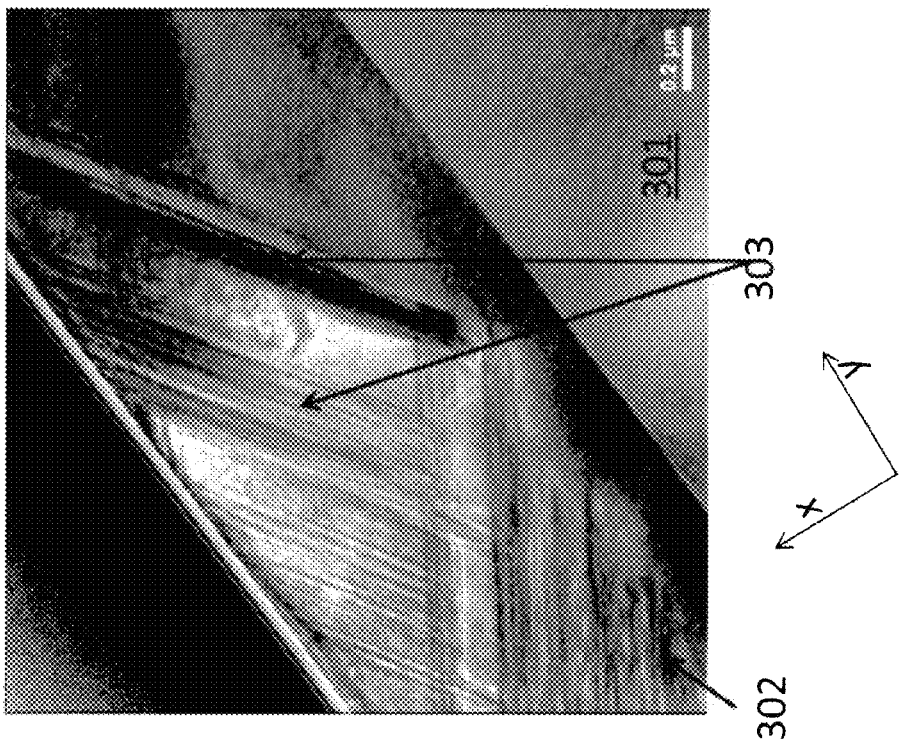
FIG. 3A is a transmission electron microscopy (TEM) image of a cross-section of a lithium niobate waveguide made in accordance with previously known methods.

The waveguides of the present invention may be formed using a combination of steps that, together, reduce or eliminate many of the aforementioned problems associated with previously known lithium niobate waveguides, particularly drift in the refractive index and electrical conductivity, or complexity of fabrication. These steps include a "soft" proton exchange process for changing the refractive index of the lithium niobate substrate, in which an excess of lithium ions is provided. For example, a solution of lithium benzoate in benzoic acid may be used. The excess lithium ions slow the proton exchange process, allowing the protons to diffuse deeper into the substrate and reducing or avoiding stresses associated with mismatch between the waveguide and the substrate, such as described above with respect to FIGS. 3A-3B. In some embodiments, the slow proton exchange process is performed at a temperature below the atmospheric boiling point of the solution, obviating the need to pressurize a high temperature solution, as is required by Wu et al., discussed above.

Following soft proton exchange, the substrate is annealed under a preselected vapor pressure of water, which performs numerous functions. First, the anneal step heals defects caused by the soft proton exchange process, which are already reduced because of the low proton density. The vapor pressure of water during the anneal step also inhibits or prevents the evaporation of water from the waveguide, thus inhibiting or preventing shrinkage and/or the formation of undesired species within the crystal. Additionally, the protons, which are already relatively well diffused through the substrate because of the soft proton exchange process, may continue to diffuse through the substrate, further reducing stresses resulting from crystal lattice mismatch between the waveguide and the underlying substrate. The upper surface of the waveguide is then "sealed" by performing a reverse proton exchange, which exchanges protons near the upper surface of the waveguide with lithium ions. By reducing or eliminating the presence of protons near the upper surface of the waveguide, the dehydration of the waveguide under normal operating conditions may be inhibited, greatly enhancing the stability of the waveguide.

Waveguide Structure

Figure 4:
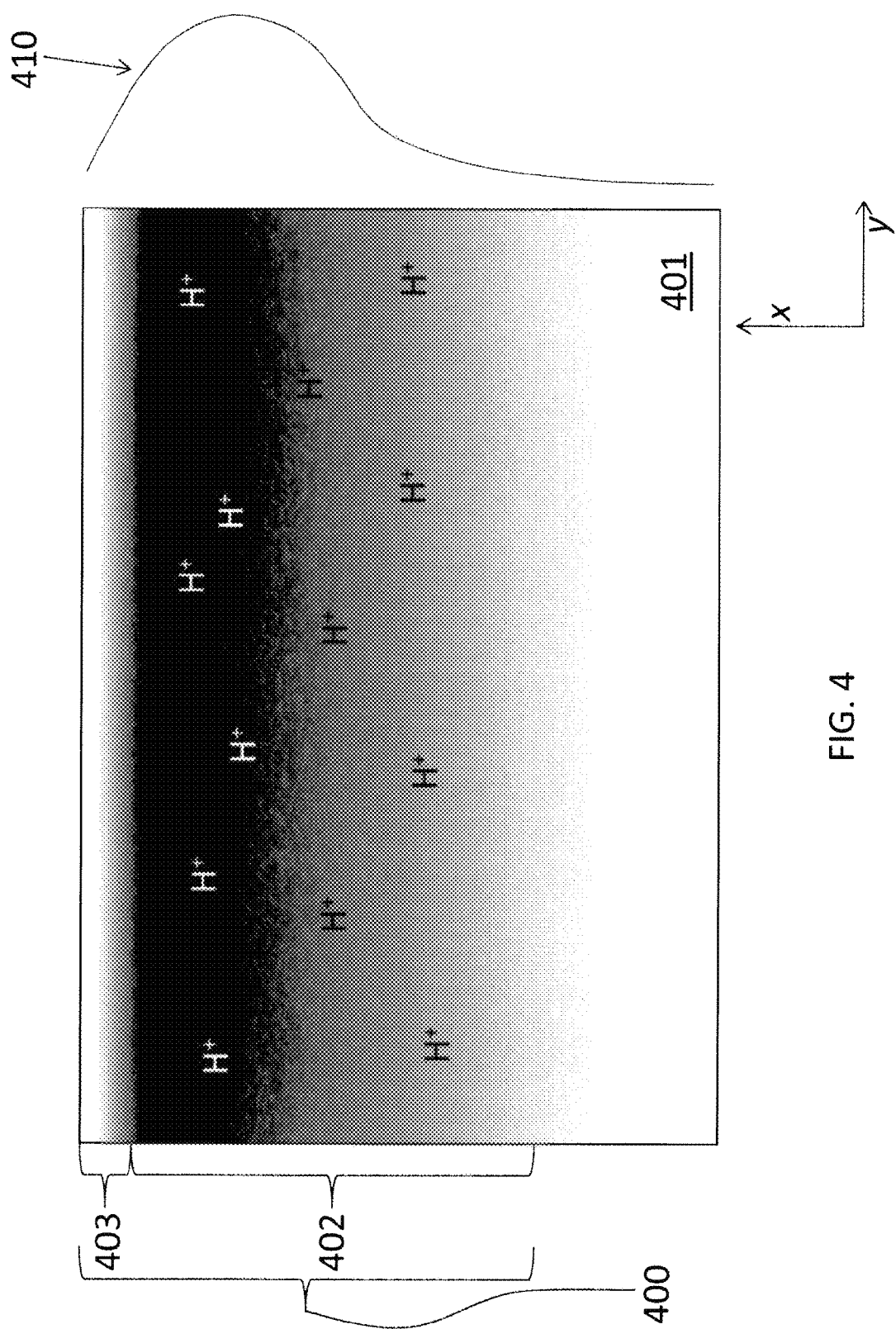
FIG. 4 schematically illustrates a cross-section of a lithium niobate waveguide, according to some embodiments of the present invention.

Referring to FIG. 4, a waveguide 400 prepared according to some embodiments of the present invention is described. Waveguide 400 is formed in lithium niobate substrate 401 and includes soft proton-exchanged layer 402 and lithium niobate overlayer 403. Soft proton-exchanged layer 402 is disposed over, and in contact with, substrate 401. The transition between substrate 401 and soft proton-exchanged layer 402 may be sufficiently gradual as to reduce stress resulting from a crystal lattice mismatch between the layer 402 and substrate 401. In some embodiments, there is essentially no stress resulting from such a mismatch, nor crystalline defects arising from such a mismatch. Lithium niobate overlayer 403 is disposed over, and in contact with, soft proton-exchanged layer 402. The transition between lithium niobate overlayer 403 and soft proton-exchanged layer 402 may be sufficiently gradual as to reduce stress resulting from a crystal lattice mismatch between the overlayer 402 and layer 403. In some embodiments, there is essentially no stress resulting from such a mismatch, nor crystalline defects arising from such a mismatch. Thus, in some embodiments, the waveguide has substantially no crystalline defects, even close to the upper surface, e.g., within about 15 nm of the upper surface of the substrate, or within about 10 nm of the upper surface of the substrate, or within about 5 nm of the upper surface of the substrate, or within about 2 nm of the upper surface of the substrate.

During use, light introduced to waveguide 400 is substantially contained within soft proton-exchanged layer 402, about which lithium niobate overlayer 403 and substrate 401 act as cladding, resulting in smoothly varying optical profile 410. The waveguide may carry, with low loss, a variety of optical wavelengths, e.g., any wavelengths within the visible and/or communication bands. In some embodiments, the optical wavelengths carried by the waveguide are in the communication band, e.g., between 1520 and 1650 nm. Because soft proton-exchanged layer 402 and overlayer 403 are each substantially defect free, there are substantially no diffusive paths by which protons in layer 402 may reach the upper surface of overlayer 403. Thus, such protons may neither increase stress in the sample, nor bond to oxygen atoms to form water at the upper surface of overlayer 403. In contrast, protons in previously known lithium niobate waveguides may be gradually transported to the upper surface of the waveguide, e.g., via diffusion paths made available by cracks or defects in the crystalline lattice, where they may form water and evaporate.

Method of Making

1. Sample Preparation

Figure 5:
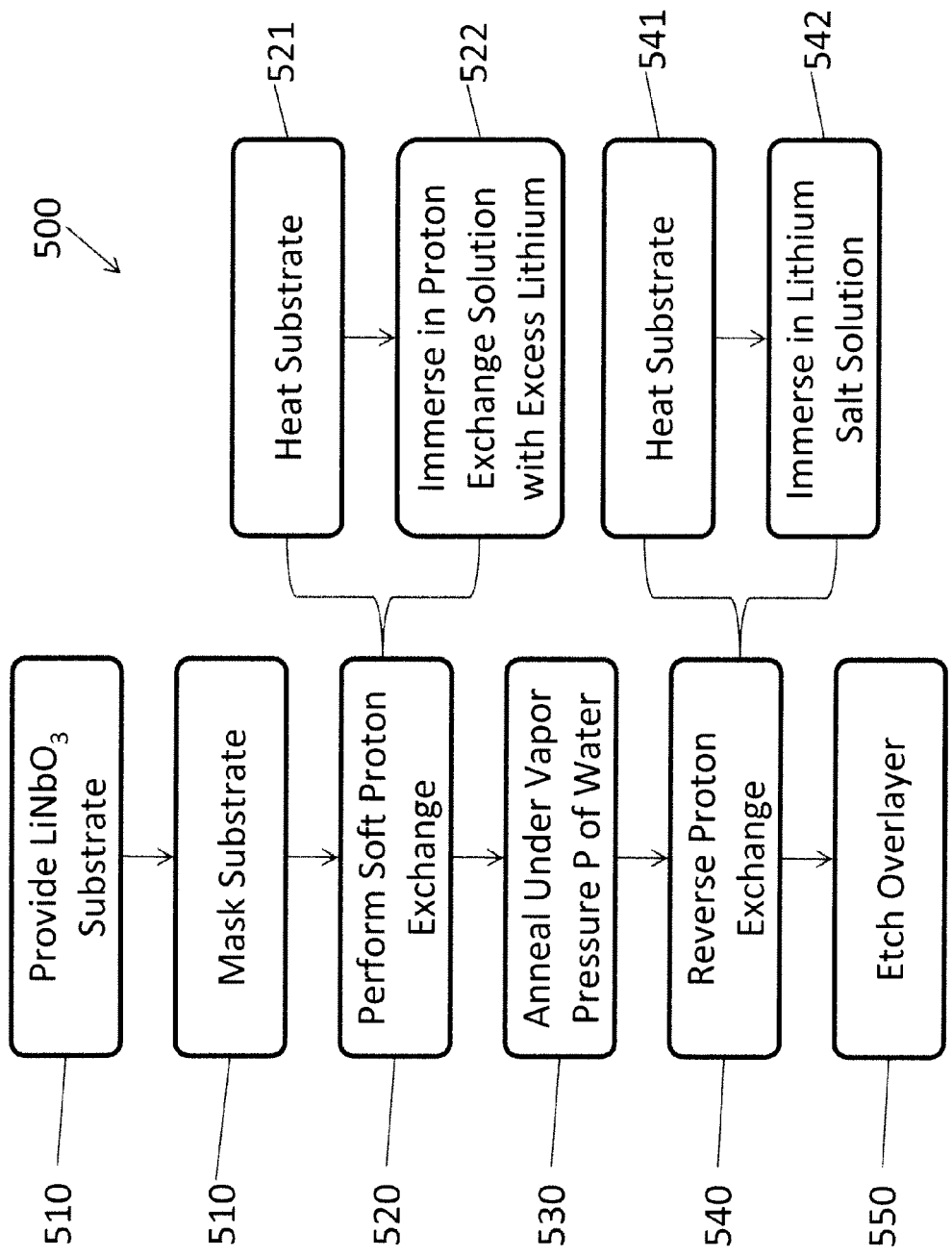
FIG. 5 illustrates steps in a method of making a lithium niobate waveguide, according to some embodiments of the present invention.

FIG. 5 illustrates steps in a method 500 for forming a stable lithium niobate waveguide, according to some embodiments of the present invention. First, a lithium niobate (LiNbO$_3$) substrate is provided (510). Substrates that are substantially defect free, and of optical quality, may be commercially purchased, for example, from Crystal Technology, Inc. (Palo Alto, Calif.). In some embodiments, the substrate is a commercially purchased x-cut lithium niobate crystal having a thickness of 0.5 mm or 1.0 mm.

If it is desired to form patterned waveguides in the substrate, the substrate may optionally be masked (520). For example, as is familiar to those of ordinary skill in the art, a substrate may be masked by applying an acid resistant layer, which is patterned by a standard photoresist process. The patterned layer defines the lateral dimensions of the waveguide to be formed in the substrate.

2. Soft Proton Exchange

Then, a soft proton exchange is performed on the substrate (520), which may include heating the substrate (521) and immersing the substrate in a proton exchange solution with excess lithium (522). This proton exchange step is referred to herein as "soft" because the substrate is exposed to a solution that contains both an acid and excess lithium ions (i.e., lithium ions other than those that leave the substrate upon proton exchange). In contrast, in a "hard" proton exchange the substrate would be exposed to a solution lacking excess lithium ions. The chemical reaction in both soft and hard proton exchange is substantially the same, but the presence of the excess lithium ions in the soft proton exchange changes the kinetics of the reaction. For example, if the solution to which the substrate is exposed contains benzoic acid ($C_6H_6$—COOH), then the reaction pathway for proton exchange is as follows:

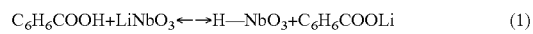

$$C_6H_6COOH + LiNbO_3 \leftrightarrow H\text{—}NbO_3 + C_6H_6COOLi \qquad (1)$$

Thus, during the proton exchange, benzoic acid and lithium niobate are in an equilibrium reaction with hydrogen niobate (also referred to as niobic acid) and lithium benzoate. This reaction occurs on the surface of the substrate exposed to the solution; as protons at the surface diffuse downward into the crystal, the reaction is driven forward. As such, adding an appropriate amount of additional lithium ions to the benzoic acid solution, e.g., in the form of lithium benzoate, may sufficiently shift the equilibrium of the reaction back towards the left to slow, but not stop, the reaction. As such, the protons may diffuse more deeply into the substrate, resulting in a lower proton concentration and reduced lattice distortion.

The concentration of excess lithium ions in the solution may be selected to maintain a sufficiently low concentration of protons at the substrate surface to substantially avoid the formation of defects, while still allowing the reaction to occur on a commercially feasible time frame. In some embodiments, the solution to which the substrate is exposed contains about 98% to about 94% by weight of a proton exchange acid, and about 2% to about 6% by weight of the lithium salt of that acid. In other embodiments, the solution to which the substrate is exposed contains about 97% to about 95% by weight of a proton exchange acid, and about 3% to about 5% by weight of the lithium salt of that acid. In still other embodiments, the solution to which the substrate is exposed contains about 96.5% to about 95.5% by weight of a proton exchange acid, and about 3.5% to about 4.5% by weight of the lithium salt of that acid. In one embodiment, the solution contains about 96% by weight of a proton exchange acid, and about 4% by weight of the lithium salt of that acid.

Because the reaction proceeds more slowly in the presence of excess lithium than would a hard proton exchange, the reaction time may be increased relative to a hard proton exchange. In one embodiment, the substrate is immersed in the soft proton exchange solution for greater than 12 hours, or greater than 24 hours, or greater than 36 hours. A variety of proton exchange acids, and the lithium salts of those acids, may be used. Examples of suitable proton exchange acids include, but are not limited to, tartaric acid, malic acid, and benzoic acid; the corresponding lithium salts are lithium tartrate, lithium malate, and lithium benzoate. One example of a suitable proton exchange acid, and its corresponding lithium salt, is benzoic acid and lithium benzoate.

The soft proton exchange may be performed, for example, at any temperature sufficient for protons to diffuse through the substrate on a commercially feasible time frame, without damaging the substrate or causing the acid or lithium salt to decompose. For example, the soft proton exchange may be performed at any suitable temperature between 200° C. and 500° C., e.g. between 220° C. and 400° C., or, e.g., between 200° C. and 250° C., or at any other suitable temperature. In preferred embodiments, the temperature is between the atmospheric melting point and the atmospheric boiling point of the proton exchange solution. For example, the atmospheric melting point of benzoic acid is about 122° C., and its atmospheric boiling point is about 250° C. It may be useful to perform the soft proton exchange between these two temperatures, and at atmospheric pressure, instead of using temperatures over the atmospheric boiling point of benzoic acid, which may require pressurization to avoid vaporizing the solution. In one illustrative embodiment, the soft proton exchange is performed using a solution of 2% to 6% lithium benzoate in benzoic acid, at atmospheric pressure, at a temperature between about 200° C. and 250° C. Of course, the soft proton exchange could be performed under pressure and above the atmospheric boiling point of the solution, if desired. The appropriate temperature and reaction time may vary, depending on the pressure under which the reaction is performed, the concentration of lithium ions, and the proton exchange acid and lithium salt selected.

Figure 6:
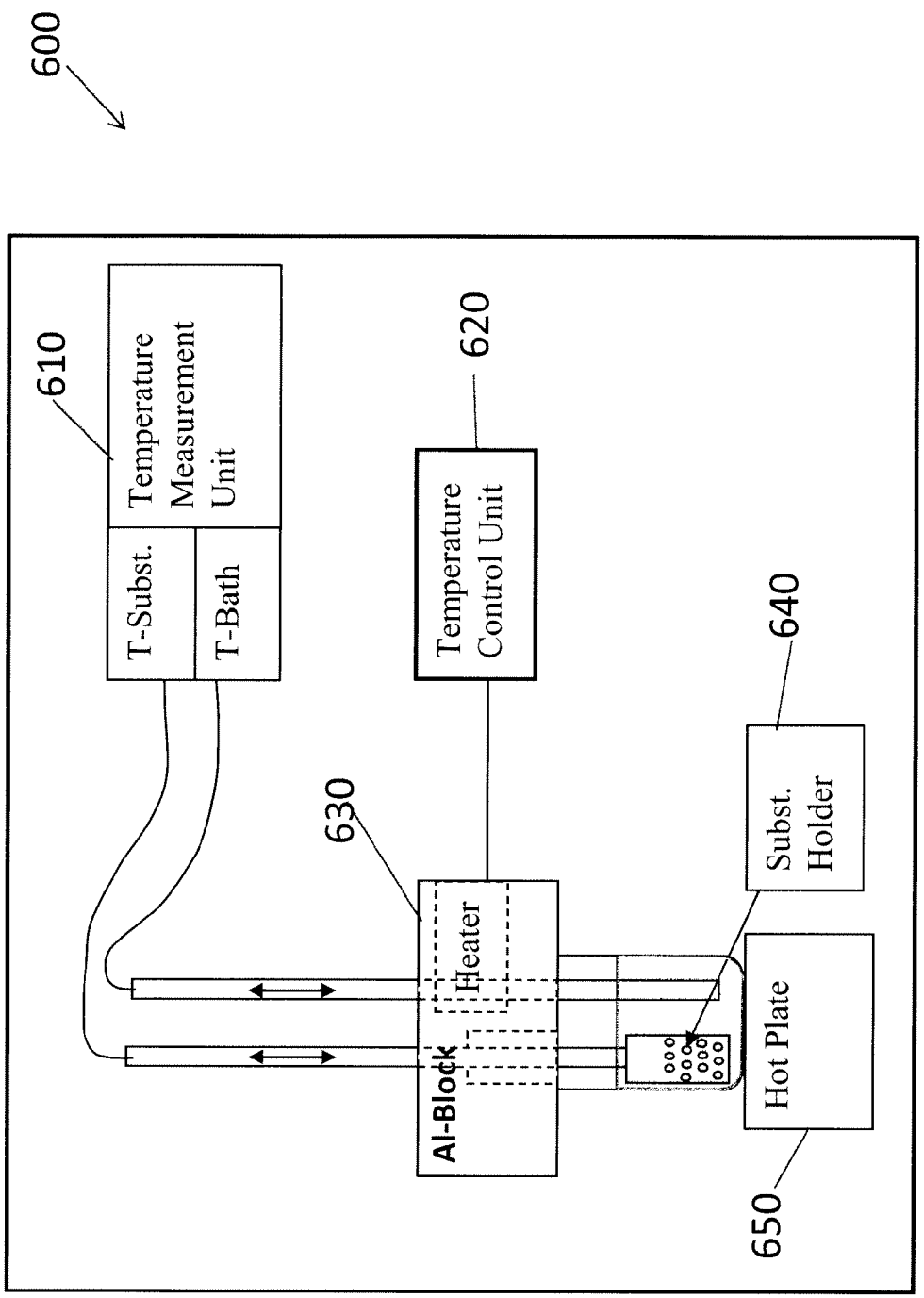
FIG. 6 schematically illustrates an overview of a system for immersing a lithium niobate substrate in a heated liquid, according to some embodiments of the present invention.

FIG. 6 schematically illustrates a system 600 that may be used to immerse a substrate into a proton exchange acid. As is familiar to those of ordinary skill in the art, some proton exchange acids are a solid at room temperature, and must be heated to a liquid state before use. However, immersing a lithium niobate substrate at a cooler temperature into a heated proton exchange acid may stress the substrate, causing dislocations and/or cracks. Likewise, rapidly cooling a lithium niobate substrate following immersion can also stress the substrate, causing dislocations or cracks. System 600 may reduce or eliminate such stresses by heating the substrate to the temperature of the proton exchange solution before immersion.

System 600 includes temperature measurement unit 610, temperature control unit 620, heater block 630, substrate holder 640, and hot plate 650. Each of these components may be in communication with each other. During use, hot plate 650 heats the proton exchange solution to a desired temperature, typically above the melting temperature of the solution. A lithium niobate substrate is loaded into substrate holder 640, which in turn is loaded into heating block 630, which in one embodiment includes a block of aluminum. Temperature control unit 620 then gradually heats heating block 630, substrate holder 640, and the lithium niobate substrate to the same temperature as the solution. The temperature measurement unit monitors the temperature of the substrate (subst.) and the temperature of the bath, and provides a signal when the two temperatures are about the same. When the substrate and solution are at the same temperature, substrate holder 640 is lowered to insert the substrate into the solution. After the substrate has been exposed to the solution for the appropriate amount of time, the substrate holder is withdrawn into heating block 630. Temperature control unit 620 then gradually reduces the temperature of heating block 630, substrate holder 640, and the substrate, until the desired temperature is reached. The substrate is then removed from substrate holder 640 for further processing.

3. Anneal

Referring again to FIG. 5, after the soft proton exchange is completed, the substrate is annealed under a water vapor pressure P (530). Such annealing may heal any distortions to the crystalline lattice that may have been caused during the soft proton exchange step, because such distortions will be smaller and fewer than would have occurred during a hard proton exchange. Annealing a soft proton-exchanged layer results in a crystalline lattice of significantly higher quality than may be obtained by annealing a hard proton-exchanged layer.

Figure 7A:
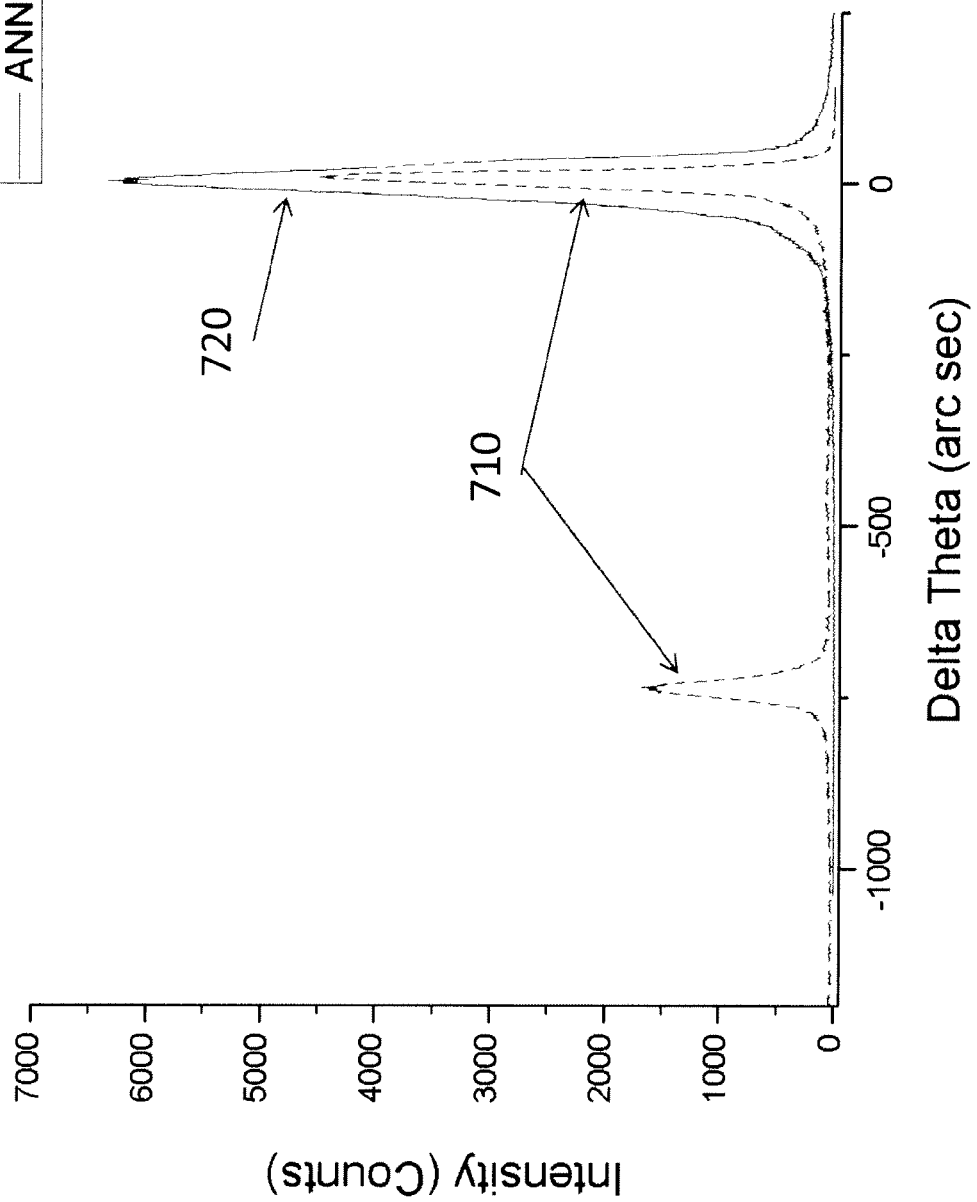
FIG. 7A illustrates the results of an X-ray diffraction measurement of a lithium niobate waveguide, according to some embodiments of the present invention.

For example, FIG. 7A shows the results of an X-ray scattering measurement performed on a substrate that was soft proton exchanged in a solution of 98% benzoic acid and 2% lithium benzoate, both before and after annealing at a temperature of 330° C. Note that the anneal for this sample was not performed under a controlled vapor pressure of water. The X-ray scattering curve 710 for the pre-annealed substrate exhibits two smooth peaks. The larger peak at about 0 arc seconds corresponds to the regular crystalline lattice of the soft proton-exchanged lithium niobate layer, while the smaller peak at about −750 arc seconds corresponds to a superlattice, similar to that discussed above with respect to FIGS. 3A-3B. The X-ray scattering curve 720 for the annealed substrate exhibits a substantially complete disappearance of the superlattice peak, instead exhibiting a single smooth, somewhat broader peak at about 0 arc seconds, corresponding to the regular crystalline lattice of the soft proton-exchanged lithium niobate layer. The smoothness of the peak and the lack of additional peaks indicate that there are substantially no major defects in the crystalline lattice of the annealed, soft proton-exchanged layer. However, the relative breadth of the peak suggests that the surface of the crystal may be slightly distorted.

Figure 7B:
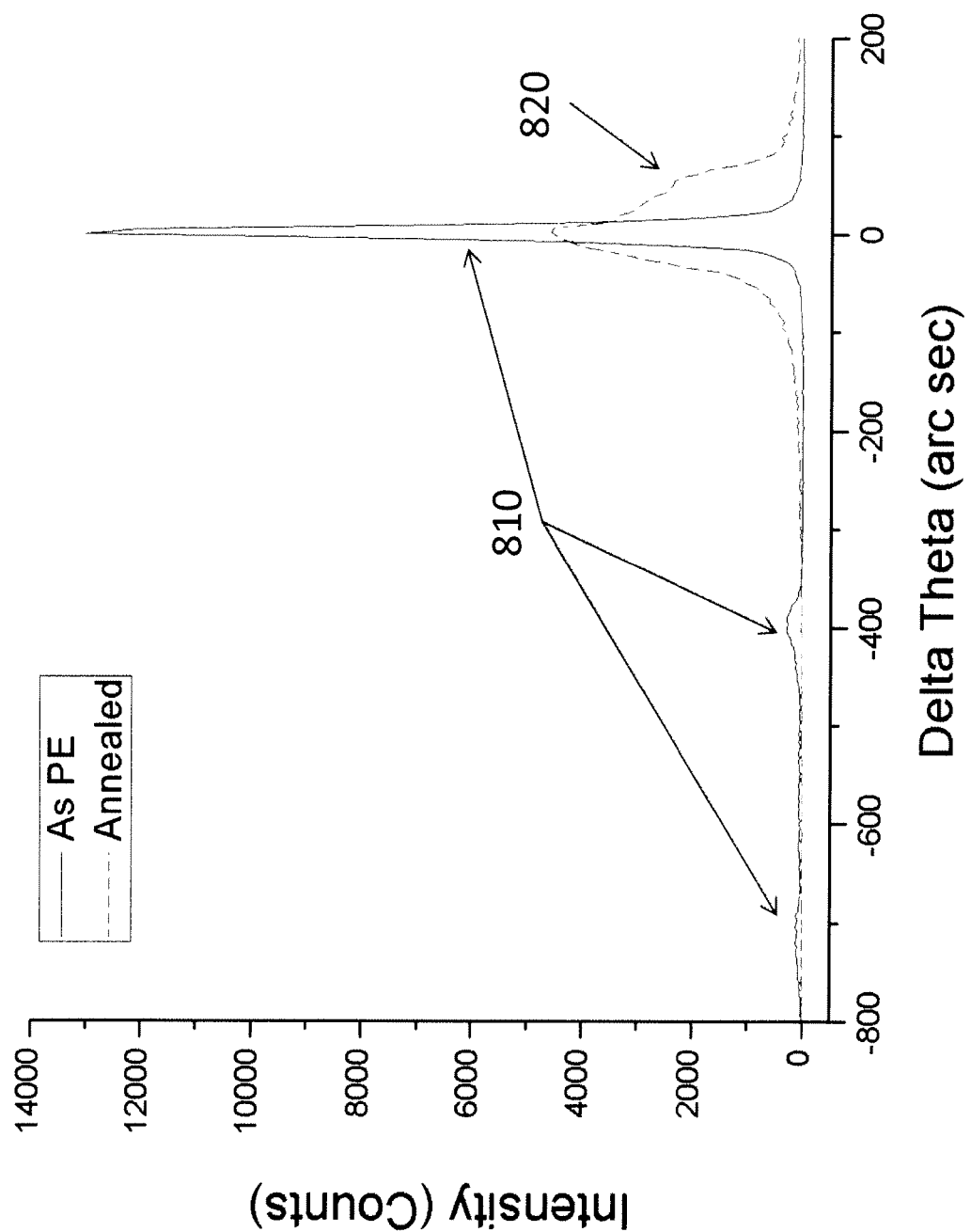
FIG. 7B illustrates the results of an X-ray diffraction measurement of a lithium niobate waveguide made in accordance with previously known methods.

In contrast, FIG. 7B shows the results of a similar X-ray scattering measurement performed on a substrate that was hard proton-exchanged in 100% benzoic acid, both before and after annealing at a temperature of 330° C. The X-ray scattering curve 810 for the pre-annealed substrate exhibits a large, smooth peak at about 0 arc seconds, corresponding to the regular crystalline lattice of the hard proton-exchanged lithium niobate layer. Curve 810 also exhibits two smaller, irregular peaks at about −400 arc seconds and about −750 arc seconds, corresponding to superlattices of various sizes within the layer. The X-ray scattering curve 820 for the annealed sample exhibits an irregular, broad, short peak at about 0 arc seconds. The breadth and height of the peak indicate that the hard proton-exchanged layer contains many defects, even after anneal.

Additionally, performing the anneal under a controlled vapor pressure P of water inhibits the evaporation of water that forms chemically on the surface. It is known that lithium niobate decomposes at high temperature (greater than 500° C.) according to the following reaction:

$$3LiNbO_3 \leftrightarrow Li_2O + LiNb_3O_8 \quad (2)$$

Because this is an equilibrium reaction, if the reaction products remain near each other, they may eventually react with each other to form lithium niobate. Without wishing to be bound by any theory, the inventors believe that a crystal containing both lithium niobate and hydrogen niobate may undergo a reaction analogous to reaction (2):

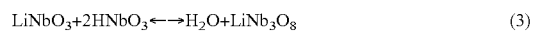

$$LiNbO_3 + 2HNbO_3 \leftrightarrow H_2O + LiNb_3O_8 \quad (3)$$

Under reaction (3), if the water evaporates from the surface, it will drive the reaction in the forward direction, increasing the conversion of lithium niobate and hydrogen niobate into water and $LiNb_3O_8$. The $LiNb_3O_8$ has a different crystal structure than lithium niobate and is not electro-optically active, so its formation may degrade the performance of the remaining crystal. Without wishing to be bound by theory, it is believed that this reaction may cause at least some of the performance degradation of conventional lithium niobate waveguides. Specifically, the waveguide may become dehydrated as protons and oxygen atoms in the waveguide bond together to form water, which may evaporate. Such dehydration may cause the waveguide layer to shrink, enhancing the lattice mismatch between the crystalline lattices of the proton exchanged layer and the substrate, increasing stress and defects.

Figure 8:
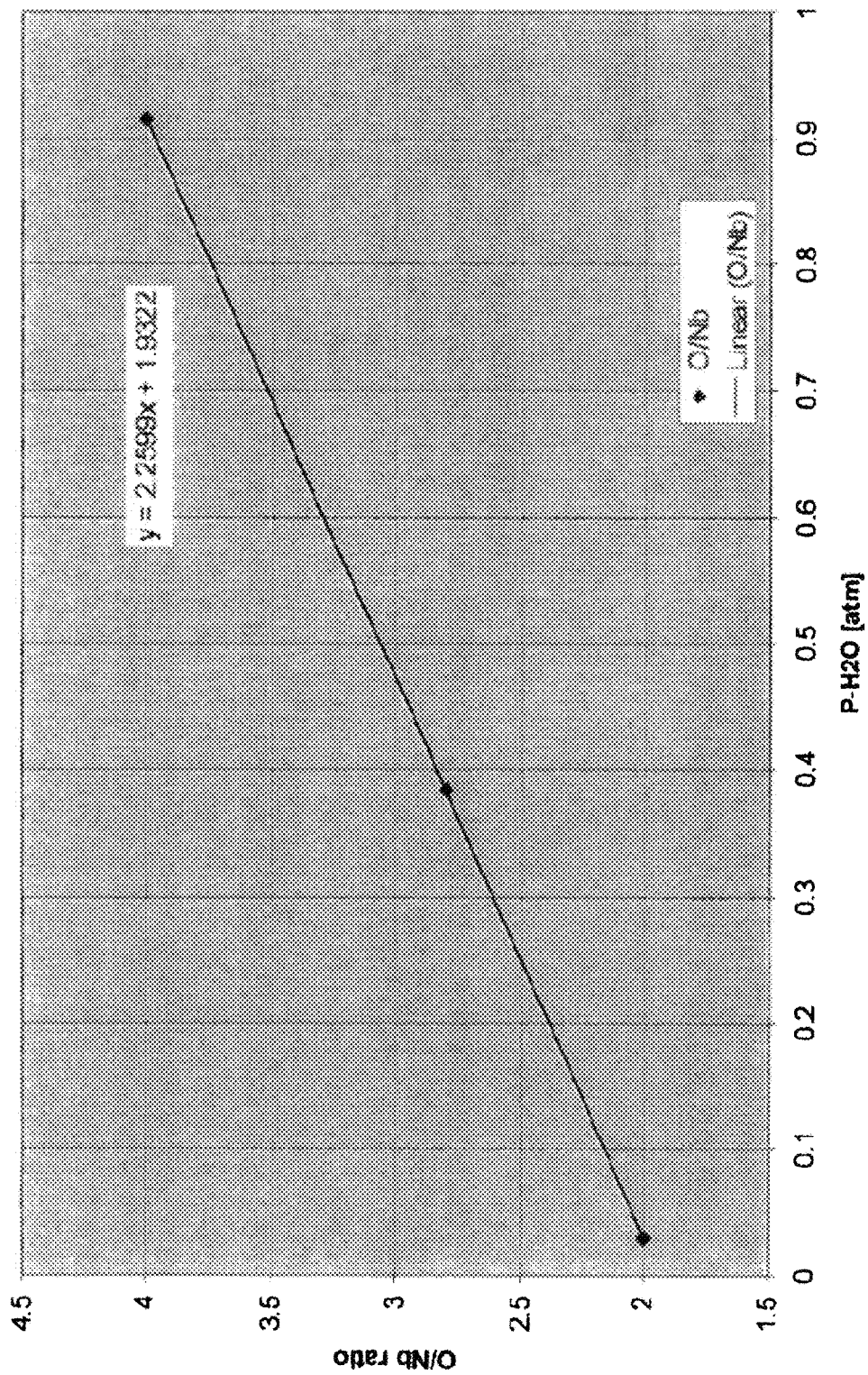
FIG. 8 illustrates the results of an X-ray photoelectron spectroscopy study of the oxygen to niobium ratio in annealed lithium niobate as a function of water vapor pressure, according to some embodiments of the present invention.

The inventors recognized that by performing an anneal step under the appropriate vapor pressure of water, reaction (3) may be driven in the reverse direction, reducing or inhibiting the formation of water and $LiNb_3O_8$, and preserving the crystalline quality of the lithium niobate and hydrogen niobate. In particular, inhibiting the formation and evaporation of water (which contains oxygen) may preserve an approximately 3:1 stoichimetric ratio of oxygen to niobium in the crystal. FIG. 8 illustrates the results of an X-ray photoelectron spectroscopy study of the oxygen to niobium ratio in annealed lithium niobate as a function of water vapor pressure, according to some embodiments of the present invention. During the study, three samples were prepared by immersing lithium niobate substrates in a soft proton-exchange solution containing 4% lithium benzoate in 96% benzoic acid for about 24 hours; and subsequently annealed for about one hundred hours at about 320° C. under one of three different vapor pressures of water: about 0.02 atm, about 0.38 atm, or about 0.92 atm. X-ray-photoelectron-spectra (XPS) were then obtained from the three samples under vacuum, and the oxygen to niobium ratio deduced from the spectra. As FIG. 8 shows, the oxygen to niobium ratio appears to be an approximately linear function of the vapor pressure of water used during the anneal. As such, it can be deduced that an oxygen to niobium ratio of about 3:1, corresponding to stoichiometric $LiNbO_3$, may be obtained by performing the anneal at a water vapor pressure of about 0.47 atm at 320° C. The particular dependence of the oxygen to niobium ratio to water vapor pressure may vary somewhat based on the temperature selected for the anneal, and the composition of the crystal following the soft proton exchange step. Additionally, if it is desired to prepare a waveguide having a stoichiometric oxygen to niobium ratio other than 3:1, e.g., 2.5:1, 3.5:1, or any other desired ratio, this ratio may easily be selected by adjusting the vapor pressure of water during the anneal.

In some embodiments, the applied vapor pressure P of water may range, for example, between about 0.2 and about 1 atm; or, for example, between about 0.3 and about 0.8 atm; or, for example, between about 0.4 and about 0.7 atm; or, for example, between about 0.45 atm and about 0.55 atm; or, for example, about 0.47 atm. The temperature of the anneal may be, for example, between 225° C. and 450° C., e.g., between 250° C. and 425° C., e.g., between 275° C. and 400° C., e.g., between 300° C. and 375° C., or, e.g., between 300° C. and 350° C., or, e.g., about 320° C., or any other suitable temperature. The anneal may be performed for any suitable amount of time, e.g., for between 10 hours and 200 hours, or for between 30 hours and 120 hours, or for between 50 hours and 100 hours. The anneal may be performed in an enclosed vessel such as a quartz, sapphire, or steel ampoule.

4. Reverse Proton Exchange

Referring again to FIG. 5, following anneal at 530, the substrate may be subjected to a reverse proton exchange process (540). During such a reverse proton exchange, the substrate may be heated (541) and then immersed in a lithium salt solution (542), e.g., using techniques and equipment analogous to those used for the soft proton exchange described above. The reverse proton exchange may be performed at any temperature at which lithium ions that react at the substrate surface may diffuse to a sufficient depth within a commercially feasible time frame, for example, between 200° C. and 500° C., e.g. between 250° C. and 450° C., e.g., between 300° C. and 400° C., or, e.g., between 250° C. and 300° C., or at any other suitable temperature. Because lithium diffuses relatively slowly, and because the soft proton-exchanged layer contains few if any defects, the reaction may take greater than 12 hours, or greater than 24 hours, or greater than 36 hours to provide a sufficiently thick overlayer of lithium niobate to protect the underlying soft proton-exchanged layer under the intended operating conditions.

A variety of lithium salts may be suitable for a reverse proton exchange reaction, including lithium nitrate, and a eutectic mixture of lithium nitrate, potassium nitrate, and sodium nitrate. If the lithium salt is lithium nitrate ($LiNO_3$), then the reaction proceeds as follows:

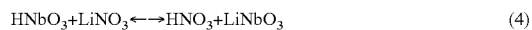

$$HNbO_3 + LiNO_3 \leftrightarrow HNO_3 + LiNbO_3 \qquad (4)$$

Thus, at the upper surface of the substrate, a portion of the soft proton-exchanged layer formed in steps 520 and 530 is replaced with a thin overlayer of lithium niobate. During use, the lithium niobate overlayer protects the underlying soft proton-exchanged layer. Specifically, because the upper surface of the substrate contains substantially no hydrogen niobate, i.e., consists essentially of lithium niobate, then reaction (3) above may not take place and water may not form during normal operation of the waveguide, thus inhibiting dehydration. Additionally, because the lithium niobate overlayer is substantially defect free, there are substantially no paths for hydrogen in the underlying soft proton-exchanged layer to migrate to the surface to form water. As such, the resultant waveguide exhibits a high stability in a wide variety of operating environments.

Figure 9A:
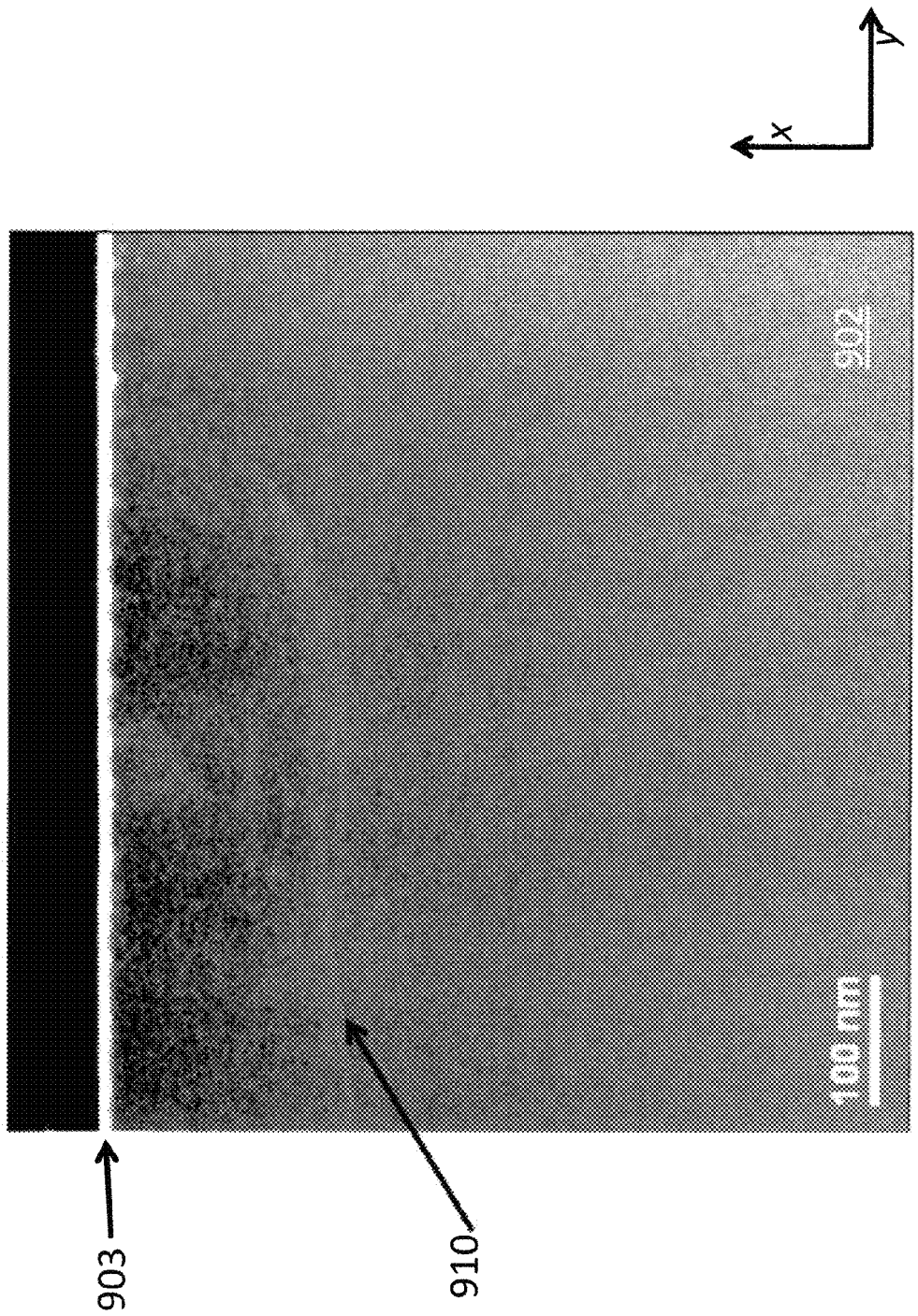
FIGS. 9A and 9B illustrate TEM images of a cross-section of a lithium niobate, according to some embodiments of the present invention.
Figure 9B:
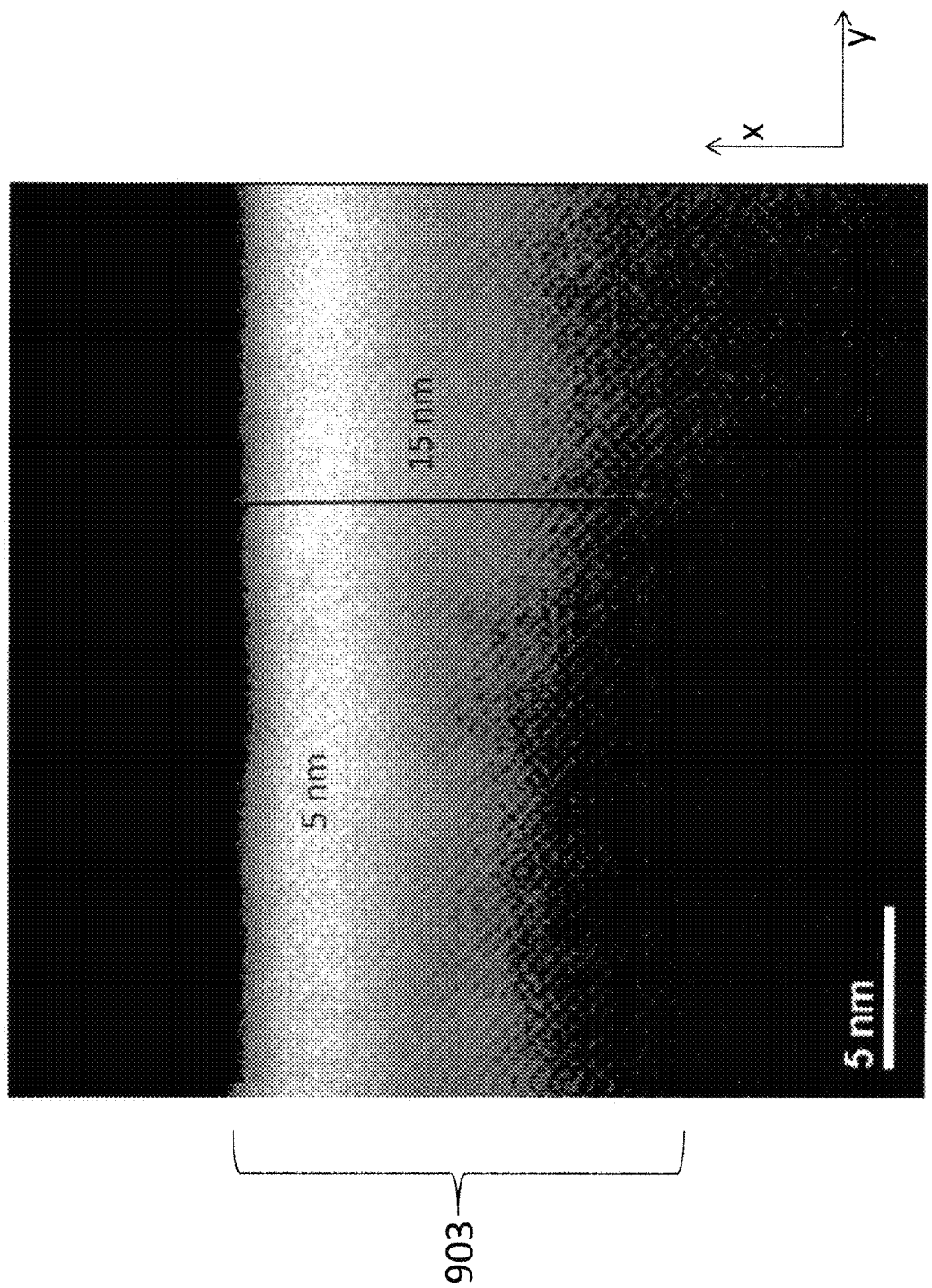

FIGS. 9A and 9B are transmission electron microscopy (TEM) images of a cross-section of a substrate processed according to the method of FIG. 5, including a soft proton exchange (510) using a solution of 4% lithium benzoate in 96% benzoic acid; an anneal at 330° C. under 1 atm of water vapor pressure; and reverse proton exchange (RPE) using a solution containing a 9:3:5 eutectic mixture of $KNO_3$: $NaNO_3$:$LiNO_3$ at 300° C. As can be seen in FIG. 9A, the crystalline lattice of soft proton-exchanged layer 902 is substantially homogeneous, with a few defects 910 faintly visible. As can be better seen in FIG. 9B, approximately the top 5 nm of lithium niobate overlayer 903 appear bright, as a result of defects near the surface. However, the quality of the deeper portions of overlayer 903 may be seen to have a regular crystal lattice, and substantially no defects. As described in greater detail below, defects at the top surface of overlayer may easily be removed using an optional etch.

Figure 10A:
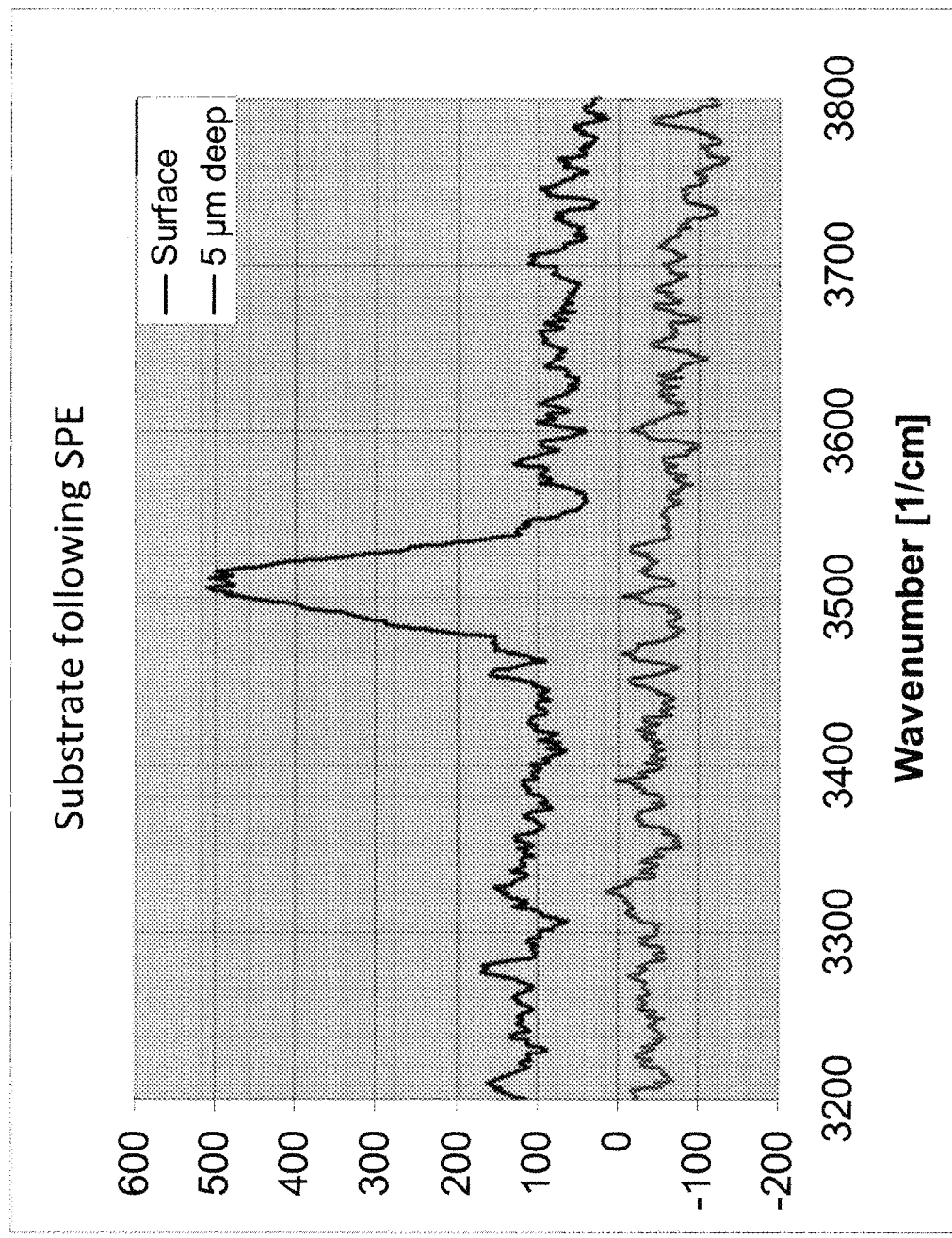
FIGS. 10A-10C illustrate Raman spectra at different depths of a lithium niobate waveguide during different steps of the method of FIG. 5.
Figure 10B:
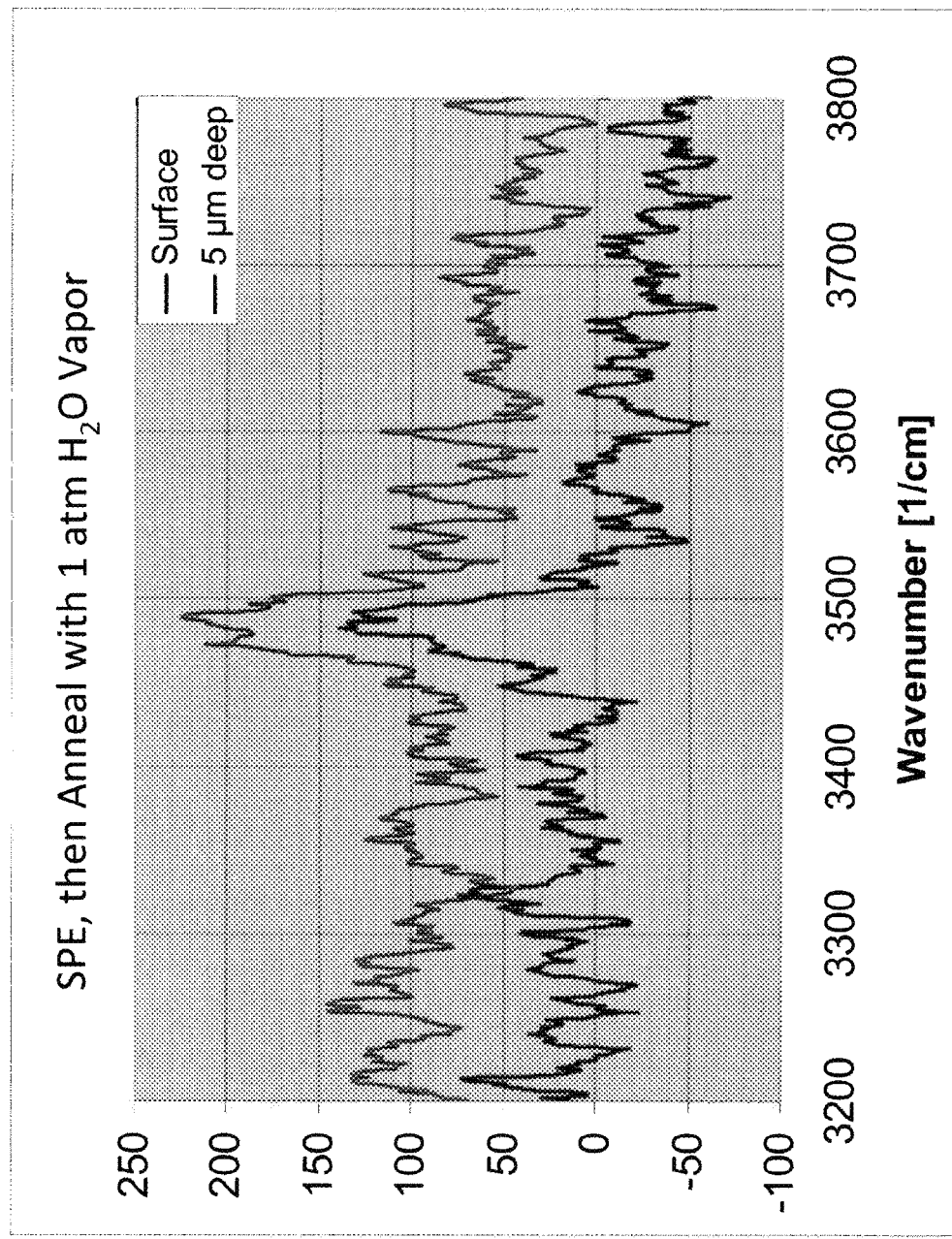
Figure 10C:
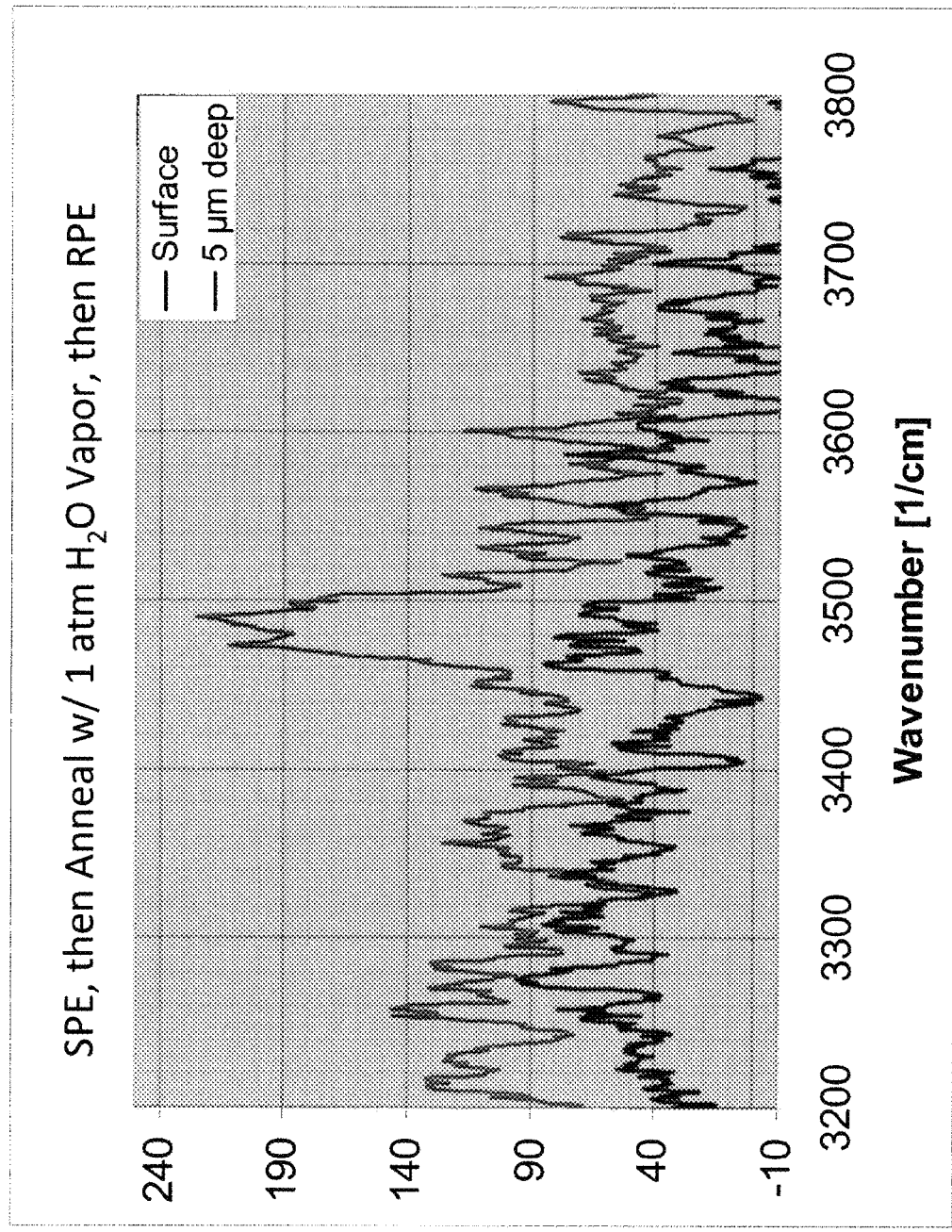

Waveguides similar to that shown in FIGS. 9A-9B were characterized using Raman spectroscopy during different steps of its fabrication. Specifically, laser light at 514 nm was focused with a microscope onto different portions of the waveguide, and a spectrum obtained of the backscattered light. FIG. 10A shows the results of a Raman measurement of the OH peak, centered near 3500 cm$^{-1}$, at two different depths in a waveguide following soft proton exchange (SPE) using a solution of 4% lithium benzoate in 96% benzoic acid. As can be seen, there are essentially no protons at a depth of 5 microns in the waveguide, but a prominent OH peak at the surface of the waveguide. FIG. 10B shows the results of a Raman measurement of the OH peak of a sample like that of FIG. 10A, but that was additionally annealed at 330° C. under 1 atm of water vapor pressure. As can be seen from the two OH peaks, there are protons present both at the surface and at a depth of 5 microns. Thus, the anneal step caused protons to transport significantly deeper into the substrate than with soft proton exchange alone. FIG. 10C shows the results of a Raman measurement of the OH peak of a sample like that of FIG. 10B, but that was additionally reverse proton exchanged using the above-described method. As can be seen, there does not appear to be an OH peak discernable over the noise level at the surface, but there is a prominent OH peak at a depth of 5 microns. Thus, the RPE step caused additional transport of protons away from the surface and deeper into the substrate.

The combination of soft proton exchange, anneal under water vapor pressure, and reverse proton exchange can thus be seen to produce waveguides having few, if any, defects; few, if any, protons at the surface; and a high proportion of protons deep within the waveguide. Such waveguides are expected to be extremely reliable in a variety of operating conditions, and are also expected to have a superior optical mode profile.

5. Etch

Referring again to FIG. 5, the top surface of the lithium niobate overlayer optionally may be etched (550), for example, by immersing the substrate into an aqueous solution of 1% hydrogen fluoride (HF) at room temperature for 30-60 seconds. As such, an essentially defect free overlayer may be provided, having a low electrical conductivity and having sufficient thickness to protect the underlying soft proton-exchanged layer during use.

Figure 11:
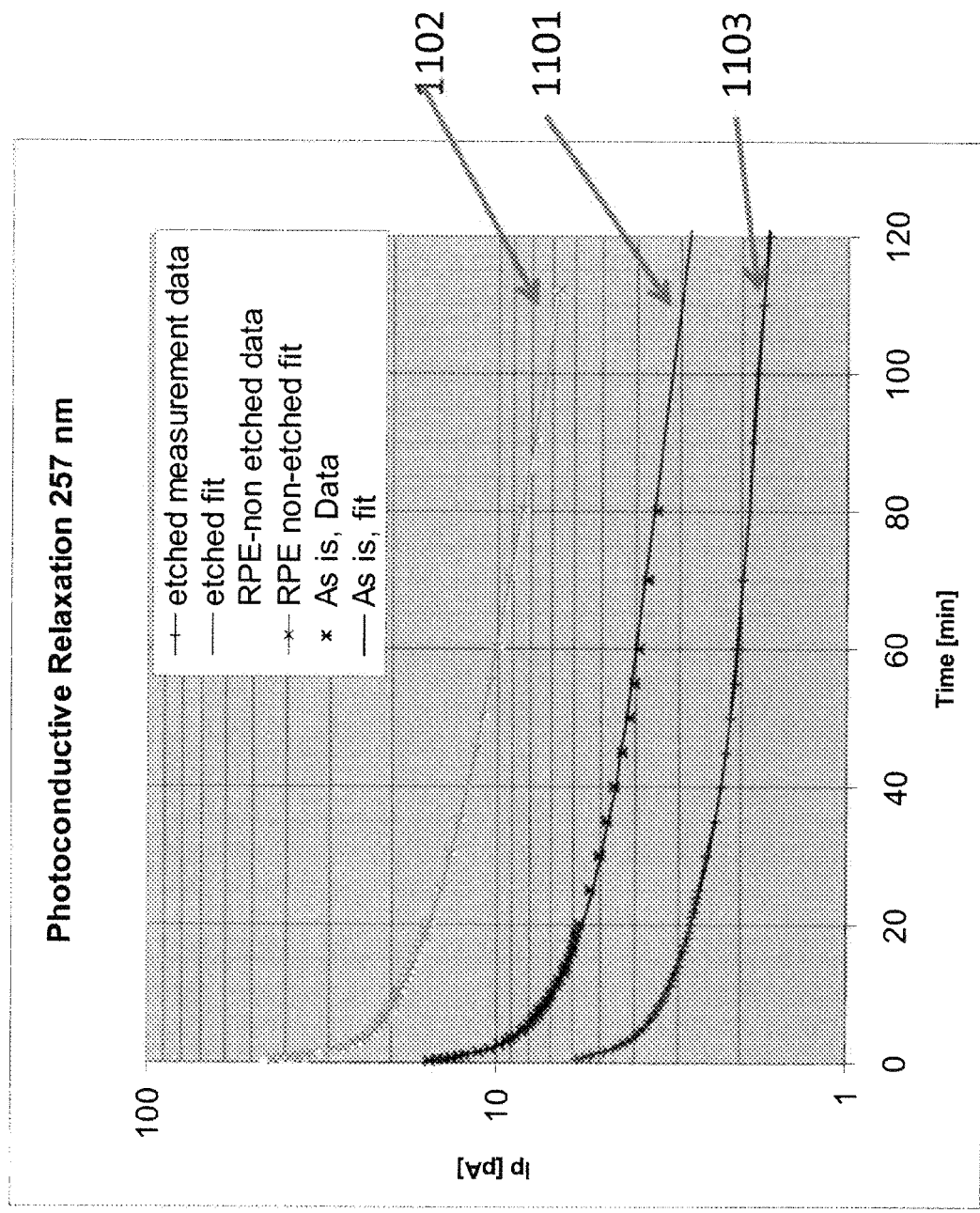
FIG. 11 illustrates the results of photoconductivity measurements on a lithium niobate waveguide during different steps of the method of FIG. 5.

For example, FIG. 11 illustrates the results of a photoconductive relaxation study performed on three samples. The first sample, referred to as "as is" in FIG. 11, was prepared by immersing a lithium niobate substrate in a soft proton exchange solution of 4% lithium benzoate in 96% benzoic acid, followed by an anneal at 320° C. under 1 atm of water vapor pressure. The second sample was prepared substantially identically to the first, but was subsequently subjected to an RPE process as described above. The third sample was prepared substantially identically to the second, but was subsequently subjected to an etch in hydrofluoric (HF) acid to remove the top few nanometers of the lithium niobate overlayer. As FIG. 11 shows, following excitation with UV-light at 254 nm, the photoconductive relaxation curve 1102 for the RPE sample exhibited the highest conductivity. The photoconductive relaxation curve 1101 for the "as is" sample had a somewhat lower conductivity than that of the RPE sample. The photoconductive relaxation curve 1103 for the etched RPE sample had the lowest conductivity of the three samples, nearly an order of magnitude less than that of the unetched RPE sample. Thus the etch step may successfully remove residual defects at the surface of the waveguide, resulting in a lower electrical conductivity.

Other Embodiments

Embodiments of the present invention provide lithium niobate waveguides stable in a wide variety of environments. As noted above, lithium niobate waveguides are typically provided with complex circuitry to compensate for drifts in the critical bias voltage, $V\pi$. Some embodiments of the present invention may not need to use such circuitry, because essentially no drift in electrical bias is expected under normal operating conditions. For example, it is believed that at least some embodiments of the inventive waveguides may be expected to operate successfully for over 100 days, or even for over a year, without the need for bias adjustments or complex compensation circuitry.

Figure 1A:
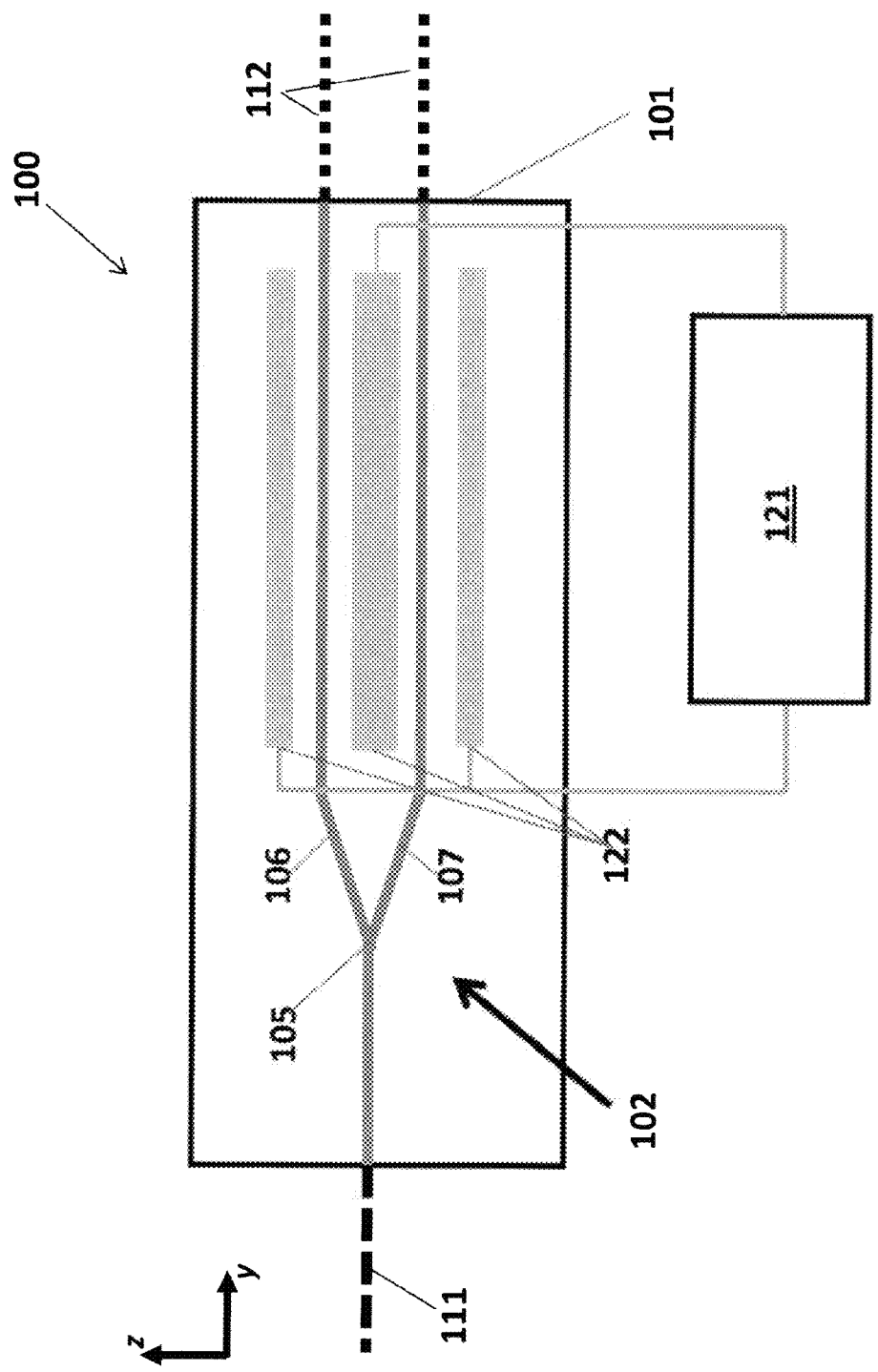
FIGS. 1A-1B schematically illustrate plan and cross-sectional views, respectively, of a previously known electro-optically active device including a lithium niobate waveguide.
Figure 1B:
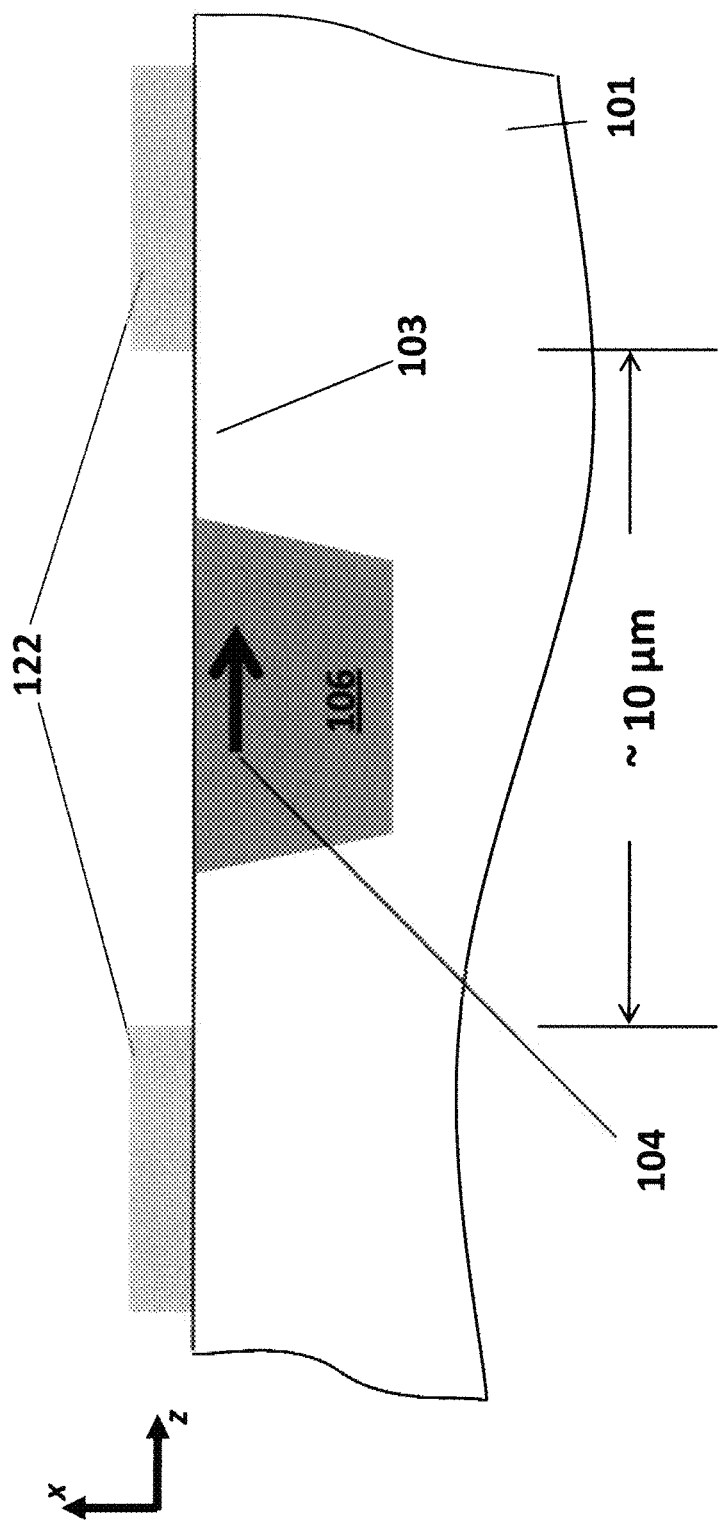
Figure 1C:
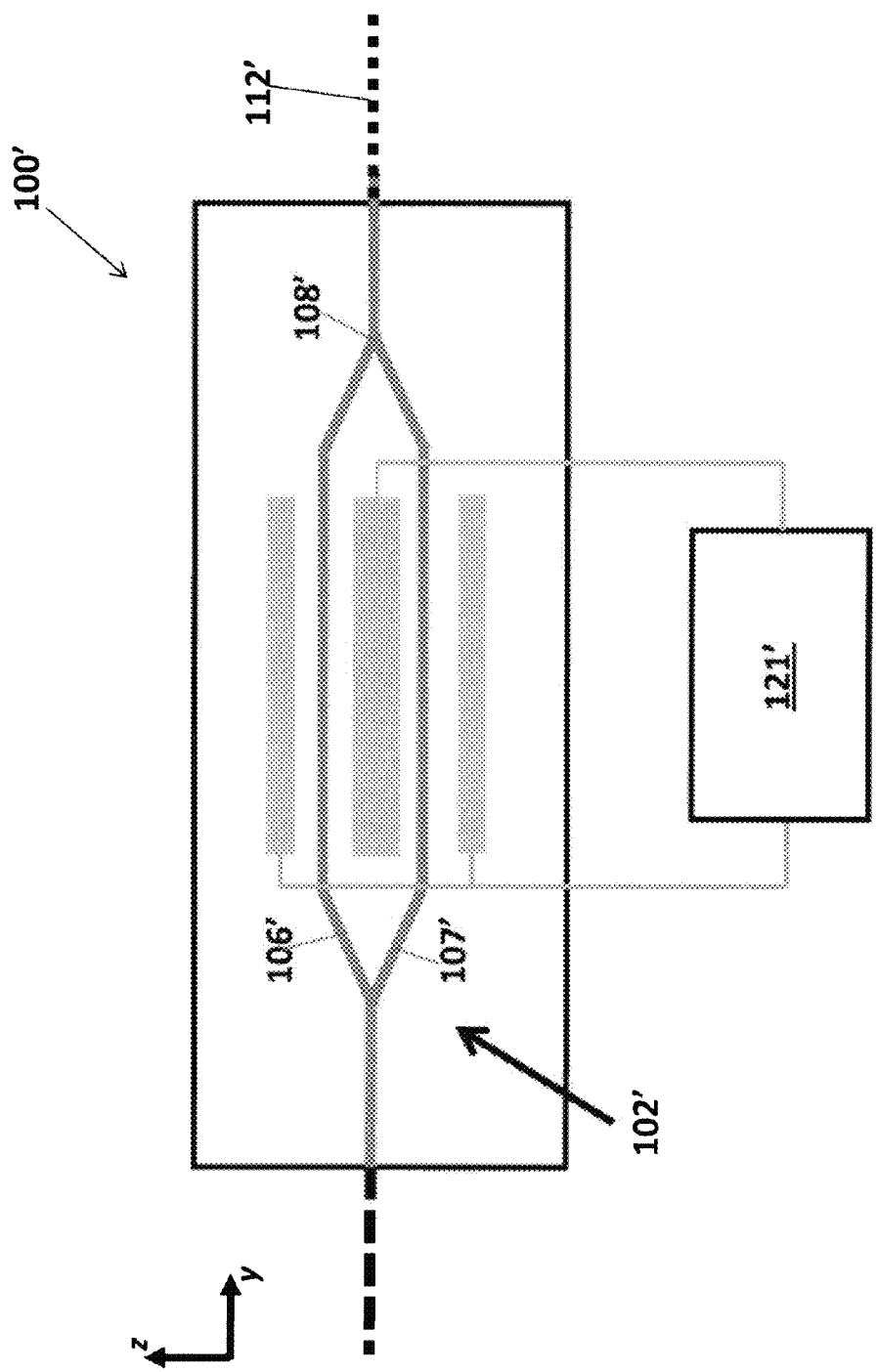
FIG. 1C schematically illustrates a plan view of an alternative previously known electro-optically active device including a lithium niobate waveguide.
Figure 2:
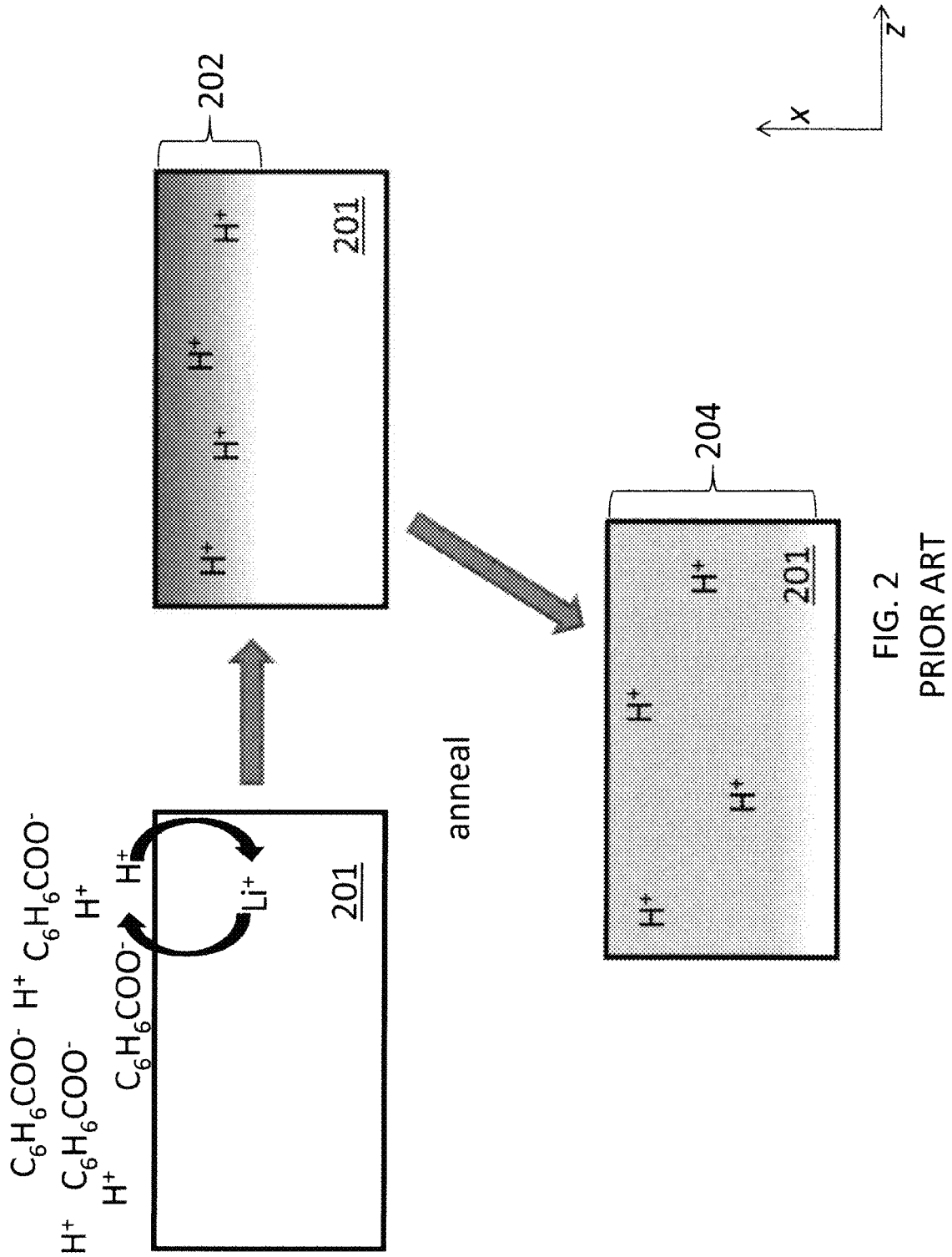
FIG. 2 is a schematic cross-sectional view illustrating typical chemical changes in a lithium niobate waveguide made in accordance with previously known methods.

While preferred embodiments of the invention are described herein, it will be apparent to one skilled in the art that various changes and modifications may be made. For example, it should be understood that the inventive waveguides may be fabricated to have any one of a variety of configurations, including but not limited to the configurations illustrated in FIGS. 1A-1C. The appended claims are intended to cover all such changes and modifications that fall within the true spirit and scope of the invention.

What is claimed is:

1. A waveguide, comprising:
   a lithium niobate substrate having an upper surface; and
   a soft proton-exchanged layer embedded within the substrate,
   the soft proton-exchanged layer formed by exposing the lithium niobate substrate to a proton exchange solution including a proton exchange acid and a lithium salt of the proton exchange acid at a temperature of less than an atmospheric boiling point of the solution, followed by annealing the lithium niobate substrate under a vapor pressure of water preselected to inhibit protons in the substrate from forming water and evaporating from the upper surface of the substrate, and
   further comprising an overlayer comprising lithium niobate, the overlayer embedded between the upper surface of the lithium niobate substrate and the soft proton-exchanged layer,
   wherein the overlayer comprises a substantially defect free region extending between about 10 nm below the upper surface of the substrate and the soft proton-exchanged layer.

2. The waveguide of claim 1, wherein the soft proton-exchanged layer consists essentially of lithium niobate and hydrogen niobate.

3. The waveguide of claim 1, said preselected water vapor pressure being between about 0.1 atm and about 0.9 atm.

4. The waveguide of claim 1, said preselected water vapor pressure being between about 0.4 atm and about 0.6 atm.

5. The waveguide of claim 1, wherein the proton exchange acid is benzoic acid, the lithium salt of the proton exchange acid is lithium benzoate, and the temperature is between about 122° C. and 250° C.

6. The waveguide of claim 1, wherein the overlayer inhibits substantially all transport of protons from the soft proton-exchanged layer to the upper surface of the substrate.

7. The waveguide of claim 1, wherein the overlayer consists essentially of lithium niobate.

8. The waveguide of claim 1, wherein the overlayer is formed by exposing the annealed soft proton-exchanged layer to a reverse proton-exchange solution, the reverse proton-exchange solution comprising a lithium salt.

9. A method of making a waveguide, the method comprising:
   providing a lithium niobate substrate having an upper surface;
   forming a soft proton-exchanged layer comprising hydrogen niobate by exposing the upper surface of the substrate to a soft proton-exchange solution, the soft proton-exchange solution comprising a proton exchange acid and a lithium salt of the proton exchange acid at a temperature of less than an atmospheric boiling point of the solution; and
   annealing the soft proton-exchanged layer under a vapor pressure of water preselected to inhibit protons in the hydrogen niobate from forming water and evaporating from the upper surface of the substrate.

10. The method of claim 9, wherein the soft proton-exchange solution comprises about 2% to about 6% lithium benzoate and about 98% to about 94% benzoic acid.

11. The waveguide of claim 10, wherein the temperature is between about 122° C. and 250° C.

12. The method of claim 9, wherein the preselected vapor pressure of the water is between about 0.4 atm and about 0.6 atm.

13. The method of claim 9, wherein the preselected vapor pressure of the water is about 0.47 atm.

14. The method of claim 9, further comprising forming a protective lithium niobate overlayer over the annealed soft proton-exchanged layer by exposing the annealed soft proton-exchanged layer to a reverse proton-exchange solution, the reverse proton-exchange solution comprising a lithium salt.

15. The method of claim 14, further comprising etching the upper surface of the substrate after forming the protective lithium niobate overlayer.

16. The method of claim 15, wherein said etching comprises exposing the upper surface of the substrate to hydrofluoric acid.

17. A method of using a waveguide, the method comprising:
   providing a waveguide, the waveguide comprising:
      a lithium niobate substrate having an upper surface;
      a soft proton-exchanged layer formed by exposing the lithium niobate substrate to a proton exchange solution including a proton exchange acid and a lithium salt of the proton exchange acid at a temperature of less than an atmospheric boiling point of the solution, followed by annealing the lithium niobate substrate under a vapor pressure of water preselected to inhibit protons in the substrate from forming water and evaporating from the upper surface of the substrate; and
      an overlayer comprising lithium niobate, the overlayer embedded between the upper surface of the lithium niobate substrate and the soft proton-exchanged layer, the overlayer inhibiting substantially all transport of protons from the soft proton-exchanged layer to the upper surface of the substrate; and
   operating the waveguide for greater than 100 days with substantially no degradation in performance and without the use of drift-compensation circuitry.

18. The method of claim 17, further comprising operating the waveguide for greater than one year with substantially no degradation in performance and without the use of drift-compensation circuitry.

* * * * *